US009025497B2

(12) United States Patent
Razdan et al.

(10) Patent No.: US 9,025,497 B2
(45) Date of Patent: May 5, 2015

(54) MEDIA FORWARDING FOR A GROUP COMMUNICATION SESSION IN A WIRELESS COMMUNICATIONS SYSTEM

(75) Inventors: Ashu Razdan, San Diego, CA (US); Devang Narendra Bhatt, San Diego, CA (US); Rajan Verma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 290 days.

(21) Appl. No.: 12/819,973

(22) Filed: Jun. 21, 2010

(65) Prior Publication Data

US 2011/0141929 A1      Jun. 16, 2011

Related U.S. Application Data

(60) Provisional application No. 61/224,797, filed on Jul. 10, 2009.

(51) Int. Cl.
*H04L 12/16*      (2006.01)
*H04L 29/06*      (2006.01)

(52) U.S. Cl.
CPC .......... *H04L 65/4061* (2013.01); *H04L 65/605* (2013.01); *H04L 65/80* (2013.01)

(58) Field of Classification Search
None
See application file for complete search history.

(56) References Cited

U.S. PATENT DOCUMENTS

| | | | |
|---|---|---|---|
| 5,881,053 A * | 3/1999 | Kimball | 370/260 |
| 6,085,223 A | 7/2000 | Carino, Jr. et al. | |
| 6,125,343 A | 9/2000 | Schuster | |
| 6,697,342 B1 | 2/2004 | Smyth et al. | |
| 6,707,826 B1 * | 3/2004 | Gorday et al. | 370/468 |
| 6,728,222 B1 | 4/2004 | Ono | |
| 7,454,460 B2 | 11/2008 | Ivashin | |
| 7,742,587 B2 | 6/2010 | Cohen | |
| 7,908,320 B2 | 3/2011 | Ludwig et al. | |
| 2001/0008533 A1 | 7/2001 | Umayabashi | |
| 2002/0116472 A1 | 8/2002 | Kalish et al. | |
| 2002/0118650 A1 | 8/2002 | Jagadeesan et al. | |
| 2002/0119795 A1 * | 8/2002 | Dorenbosch | 455/509 |

(Continued)

FOREIGN PATENT DOCUMENTS

| | | |
|---|---|---|
| CN | 1148939 C | 5/2004 |
| CN | 1871825 A | 11/2006 |

(Continued)

OTHER PUBLICATIONS

International Search Report—PCT/US2010/040969, International Search Authority—European Patent Office—Nov. 17, 2010.

(Continued)

*Primary Examiner* — Gregory Sefcheck
*Assistant Examiner* — Amar Persaud
(74) *Attorney, Agent, or Firm* — Michael F. Taveira

(57) ABSTRACT

Embodiments are directed to media forwarding for a group communication session within a wireless communications system. A server receives a frame for a given timeslot from each of a first plurality of access terminals participating in the group communication session, each of the received frames having an associated data rate. The server selects at least one and less than all of the received frames based at least in part on the associated data rates of each of the received frames. The server sends the selected at least one frame to a second plurality of access terminals participating in the group communication session.

41 Claims, 17 Drawing Sheets

(56) References Cited

U.S. PATENT DOCUMENTS

| | | | |
|---|---|---|---|
| 2003/0120795 A1* | 6/2003 | Reinshmidt | 709/232 |
| 2004/0008635 A1 | 1/2004 | Nelson et al. | |
| 2004/0039784 A1 | 2/2004 | Jacobs et al. | |
| 2004/0054588 A1 | 3/2004 | Jacobs et al. | |
| 2006/0034340 A1* | 2/2006 | Rong et al. | 370/521 |
| 2006/0120404 A1* | 6/2006 | Sebire et al. | 370/469 |
| 2006/0143308 A1 | 6/2006 | Cazzolla et al. | |
| 2006/0146735 A1* | 7/2006 | Shaffer et al. | 370/260 |
| 2007/0104105 A1 | 5/2007 | MeLampy et al. | |
| 2007/0121597 A1* | 5/2007 | Lee et al. | 370/356 |
| 2007/0195735 A1 | 8/2007 | Rosen et al. | |
| 2007/0266075 A1 | 11/2007 | Jachner | |
| 2008/0037750 A1 | 2/2008 | Shaffer et al. | |
| 2008/0092182 A1 | 4/2008 | Conant | |
| 2008/0165707 A1* | 7/2008 | Baird et al. | 370/260 |
| 2009/0109879 A1 | 4/2009 | Kuusinen et al. | |
| 2009/0248402 A1 | 10/2009 | Ito et al. | |
| 2009/0285175 A1 | 11/2009 | Nix | |
| 2010/0074277 A1* | 3/2010 | Nishibayashi et al. | 370/474 |
| 2010/0099420 A1 | 4/2010 | Chowdhary et al. | |
| 2010/0169495 A1 | 7/2010 | Zhang et al. | |
| 2010/0239078 A1 | 9/2010 | Sweeney et al. | |
| 2010/0250753 A1 | 9/2010 | Song et al. | |
| 2010/0265834 A1 | 10/2010 | Michaelis et al. | |
| 2011/0167104 A1 | 7/2011 | Gupta et al. | |

FOREIGN PATENT DOCUMENTS

| | | |
|---|---|---|
| EP | 2068544 A1 | 6/2009 |
| JP | S62133853 A | 6/1987 |
| JP | H03289252 A | 12/1991 |
| JP | 5037655 A | 2/1993 |
| JP | H06261316 A | 9/1994 |
| JP | 7095300 A | 4/1995 |
| JP | 8149439 A | 6/1996 |
| JP | H08307456 A | 11/1996 |
| JP | 2000174909 A | 6/2000 |
| JP | 2001044946 A | 2/2001 |
| JP | 2001516890 A | 10/2001 |
| JP | 2008079024 A | 4/2008 |
| KR | 20090035728 A | 4/2009 |
| WO | 9913589 A1 | 3/1999 |
| WO | 07101043 | 9/2007 |
| WO | 2008026754 A1 | 3/2008 |
| WO | WO2008147272 A1 | 12/2008 |

OTHER PUBLICATIONS

Written Opinion—PCT/US2010/040969—ISA/EPO—Nov. 17, 2010.

* cited by examiner

MEDIA FORWARDING FOR A GROUP COMMUNICATION SESSION IN A WIRELESS COMMUNICATIONS SYSTEM

CLAIM OF PRIORITY UNDER 35 U.S.C. §119

The present application for patent claims priority to Provisional Application No. 61/224,797 entitled "Media Forwarding For a Group Communication Session In A Wireless Communications System" filed Jul. 10, 2009, and assigned to the assignee hereof and hereby expressly incorporated by reference herein in its entirety.

BACKGROUND OF THE INVENTION

1. Field of the Invention

Embodiments of the present invention are directed to media forwarding for a group communication session in a wireless communications session.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communications network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a cell or sector), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The 3rd Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

Embodiments are directed to media forwarding for a group communication session within a wireless communications system. A server receives a frame for a given timeslot from each of a first plurality of access terminals participating in the group communication session, each of the received frames having an associated data rate. The server selects at least one and less than all of the received frames based at least in part on the associated data rates of each of the received frames. The server sends the selected at least one frame to a second plurality of access terminals participating in the group communication session.

In an example, the server optionally mixes the frames if the number of frames selected for a destination is more than one. The selection and/or mixing of frames is performed for each of the plurality of access terminals but in some cases the same selected or mixed frame can be transmitted to multiple access terminals which may reduce processing load on the server. In a further example, one or more frames can be selected at least in part based on their associated data-rate(s), and the selected frame(s) can then be mixed (e.g., in a signal-processing sense). Embodiments can either be directed to relatively small groups or to large groups where a relatively small number of participants happen to talk simultaneously. Accordingly, a relatively small number of frames can be selected from a potentially high number of available frames for a timeslot, and then the selected frame(s) can be mixed and distributed to the group.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
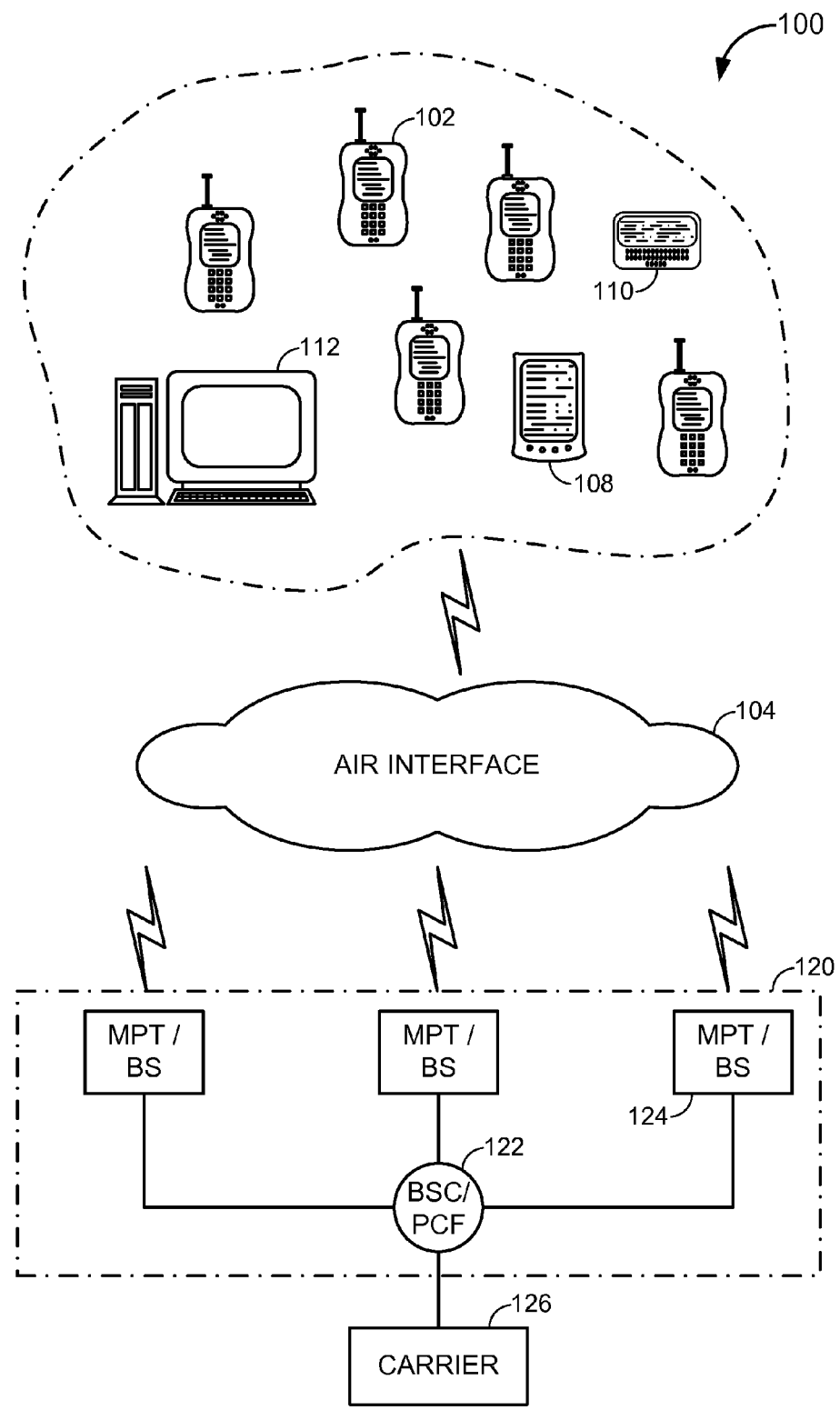
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data-rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 160 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
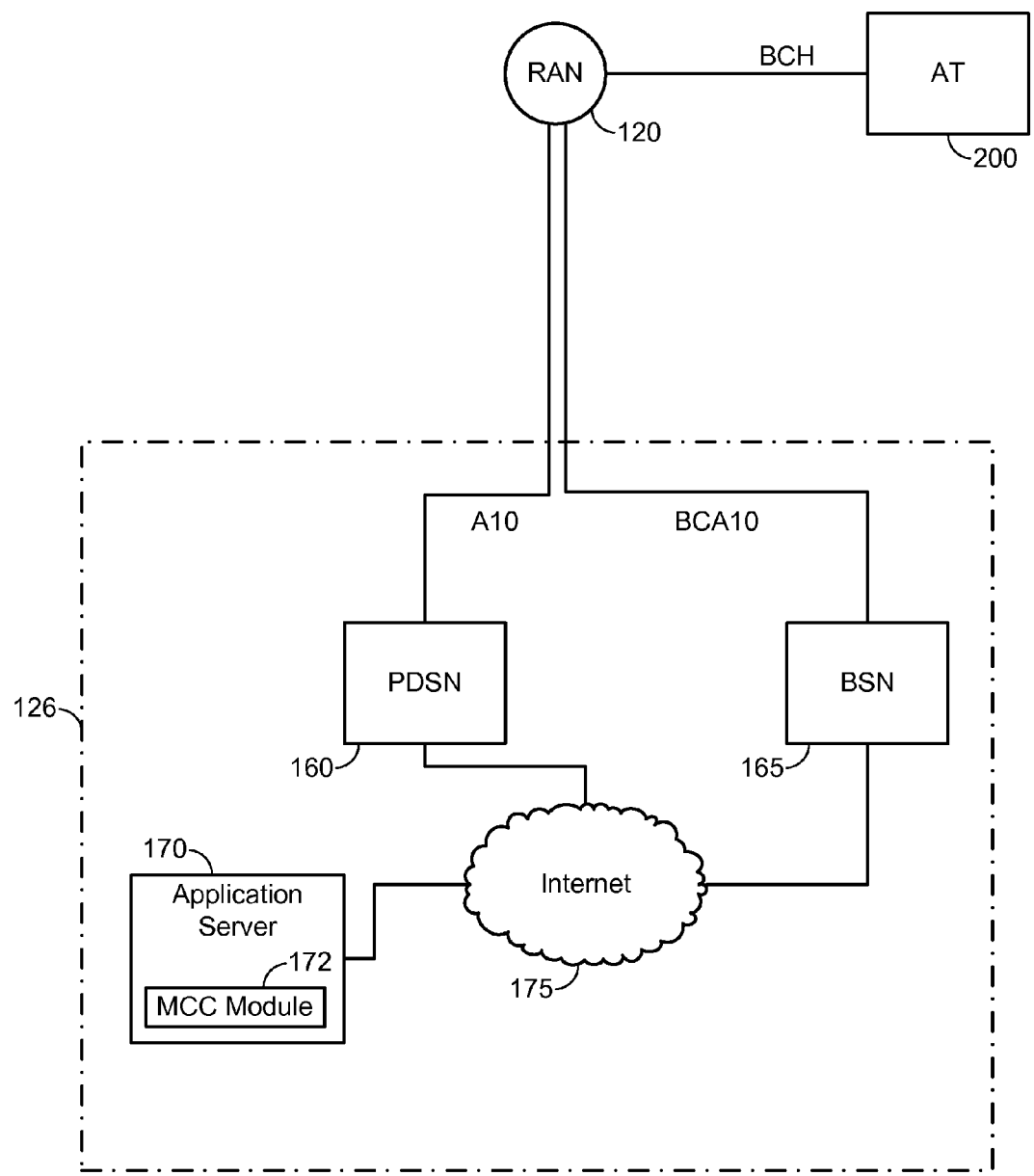
FIG. 2 illustrates the carrier network according to an example embodiment of the present invention.

FIG. 2 illustrates the carrier network 126 according to an embodiment of the present invention. In the embodiment of FIG. 2, the carrier network 126 includes a packet data serving node (PDSN) 160, a broadcast serving node (BSN) 165, an application server 170 and an Internet 175. However, application server 170 and other components may be located outside the carrier network in alternative embodiments. The application server 170 includes a media content complex (MCC) module 172, the functionality of which will be described below in greater detail. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity.

Referring to FIG. 2, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 3:
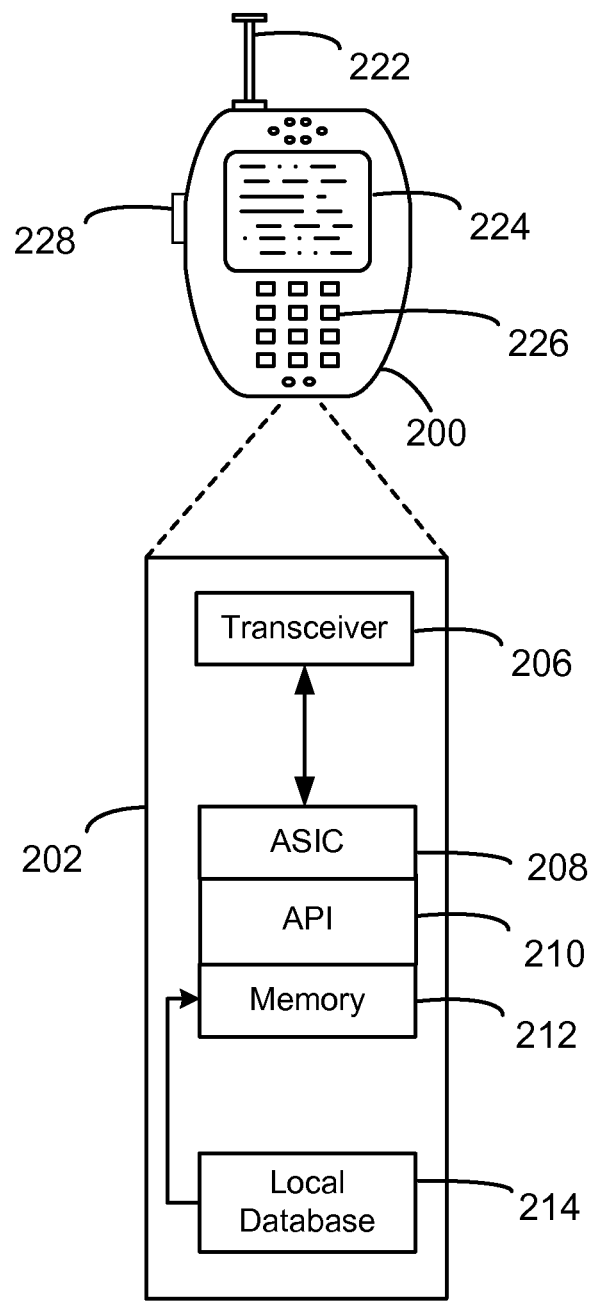
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

Figure 4A:
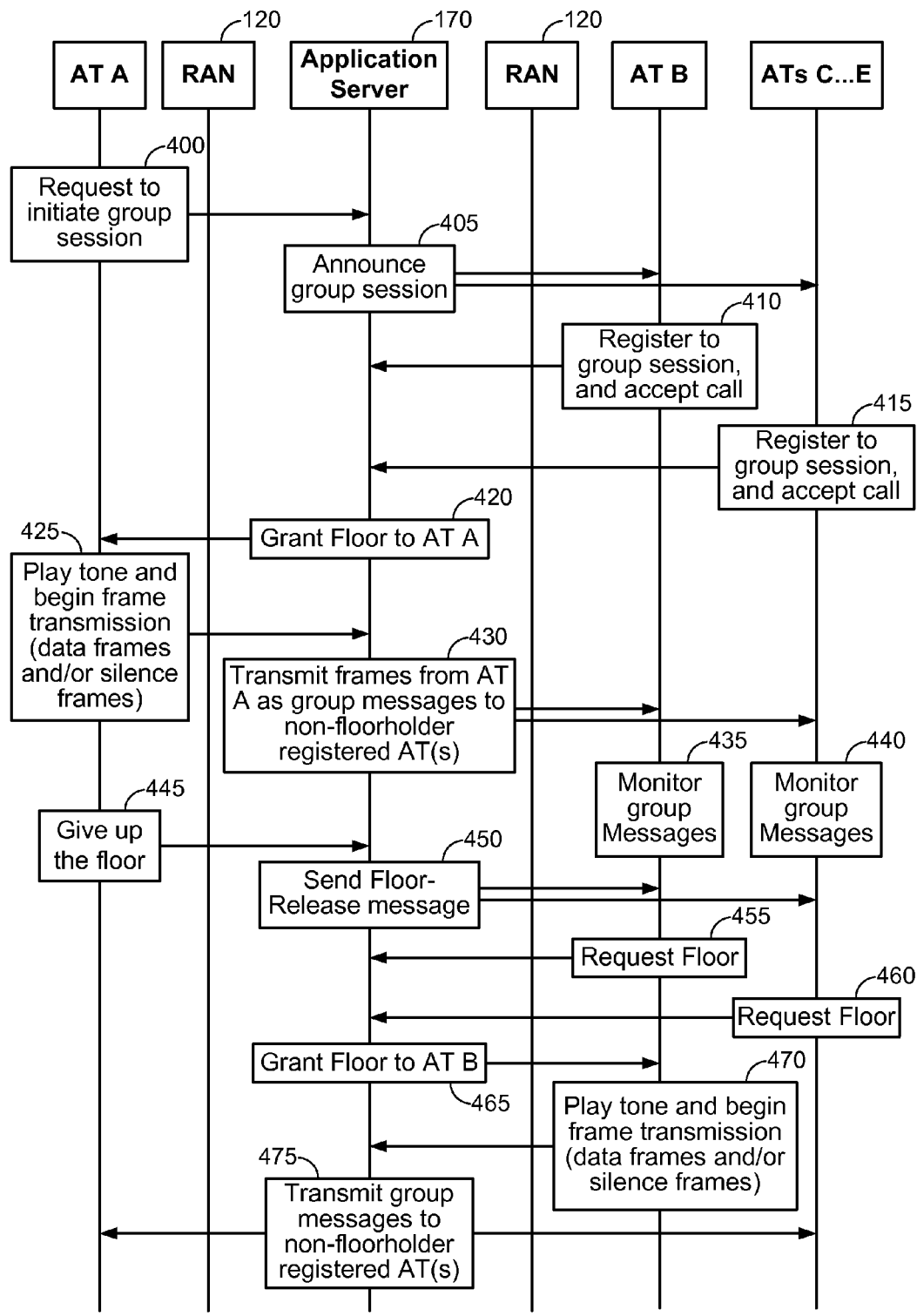
FIG. 4A illustrates a conventional half-duplex group communication session process.

FIG. 4A illustrates a conventional half-duplex group communication session (e.g., a call, a transport session, etc.) process. The group communication session of FIG. 4A may correspond to a group communication session supported by IP multicasting protocols, or IP unicasting protocols. In IP multicasting, a downlink broadcast channel (BCH) carries a single multicast flow within one or more sectors to reach each 'listening' multicast group member, while a separate scheduling message (e.g., a broadcast overhead message (BOM)) is transmitted on a downlink control channel that indicates how the multicast group members can tune to the downlink BCH. In IP unicasting, each group message is transmitted to each group communication session participant, or multicast group member, as a separate unicast message that is addressed to each group member individually.

Referring to FIG. 4A, in 400, a given AT ("AT A") sends a request to the application server 170 via the RAN 120 to initiate a group communication session. For example, the group communication session may correspond to a push-to-talk (PTT) or push-to-transfer (PTX) session, and the transmission of the request in 400 may be prompted based on a user of AT A pressing a PTT or PTX button on AT A. The application server 170 receives the group communication session request from AT A, and transmits an announce message in one or more sectors of the wireless communication system 100, 405. At least ATs B . . . E receive the announce message, and determine to join the announced group communication session. Accordingly, ATs B . . . E send a call accept message to the application server 170, and also send a registration message (e.g., BCMCSFlowRegistration message) to the RAN 120 to register to the group communication session, 410 and 415. The call accept message and registration message from each of ATs B . . . E may either be sent within separate messages on a reverse link access channel, or alternatively may be bundled within the same message.

After receiving a call accept message from a first responder to the announce message from among ATs B . . . E, the application server 170 grants the floor for the group communication session to AT A, 420. Accordingly, after receiving the floor-grant message, AT A plays a tone to indicate to a user of AT A that the user can begin speaking, and AT A begins transmitting frames on a reverse link channel to the application server 170, 425. The series of frame transmissions from 425 can correspond to data frames that actually include voice data, or alternatively can correspond to silence frames that do not actually include voice data.

Each frame transmission can correspond to a real-time transport protocol (RTP) packet or datagram, or alternatively a RTCP (RTP Control Protocol) packet. A header portion of a 40-octet overhead RTP packet may be configured as follows:

TABLE 1

Example of a RTP packet header

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| | Octet 1, 5, 9 . . . | | | | | | | | | | Octet 2, 6, 10 . . . | | | | | | Octet 3, 7, 11 . . . | | | | | | | | | | Octet 4, 8, 12 . . . | | | | | |
| 1-4 | Version | | | | IHL | | | | Type of service | | | | | | | | Total length | | | | | | | | | | | | | | | |
| 5-8 | Identification | | | | | | | | | | | | | | | | Flags | | | | | | Fragment offset | | | | | | | | | |
| 9-12 | Time to live | | | | | | | | Protocol | | | | | | | | Header checksum | | | | | | | | | | | | | | | |
| 13-16 | Source address | | | | | | | | | | | | | | | | | | | | | | | | | | | | | | | |
| 17-20 | Destination address | | | | | | | | | | | | | | | | | | | | | | | | | | | | | | | |
| 21-24 | Source port | | | | | | | | | | | | | | | | Destination port | | | | | | | | | | | | | | | |
| 25-28 | Length | | | | | | | | | | | | | | | | Checksum | | | | | | | | | | | | | | | |
| 29-32 | V = 2 | | P | X | CC | | | | M | | PT | | | | | | Sequence number | | | | | | | | | | | | | | | |
| 33-36 | Timestamp | | | | | | | | | | | | | | | | | | | | | | | | | | | | | | | |
| 37-40 | Synchronization source (SSRC) number | | | | | | | | | | | | | | | | | | | | | | | | | | | | | | | |

Referring to Table 1, the fields of the RTP packet header portion are well-known in the art. However, certain fields are discussed in more detail with respect to embodiments described in more detail below, and as such will be referred to briefly in this section. For example, the contribution count (CC) field, Sequence Number field, Timestamp field and SSRC number field will now be addressed briefly. The CC field is an optional field that can hold a contributing source (CSRC) count value. Although not shown on the header diagram of Table 1 (above), the 12 octet header of the CC field can optionally be expanded to include more contributing sources. Contributing sources can be added by a mixer at the application server 170, and are relevant for conferencing applications where elements of the data payload have originated from different computers. For point-to-point communications, CSRCs are not necessarily required. The Sequence Number field holds a unique reference number which increments by one for each RTP packet sent from a particular source, or AT. The Sequence Number field allows the receiver to reconstruct the sender's packet sequence. The Timestamp field corresponds to the time that the RTP packet was transmitted by the AT. The Timestamp field allows the receiving AT(s) to buffer and playout the data in a continuous stream. The SSRC number field corresponds to a number that identifies the source of the RTP packet, which in 425 identifies AT A. The SSRC number can be provisioned by the application server 170 at the start of the group communication session.

After the RTP header portion, the RTP packet includes a data payload portion. The data payload portion can include digitized samples of voice and/or video. The length of the data payload can vary for different RTP packets. For example, in voice RTP packets, the length of the voice sample carried by the data payload may correspond to 20 milliseconds (ms) of sound. Generally, for longer media durations (e.g., higher-rate frames), the data payload either has to be longer as well, or else the quality of the media sample is reduced.

Returning to 425 of FIG. 4A, the frames transmitted from AT A can correspond to full-rate frames (e.g., 8.6 kpbs) that have a large data payload in the RTP packet, half-rate frames (e.g., 4.3 kpbs) that include a 'medium' data payload in the RTP packet, ⅛th rate frames (e.g., 1.0 kpbs) that include a small data payload in the RTP packet, and so on. While references are generally made to EVRC-A, it will be readily apparent how these embodiments can be modified to accommodate other vocoders that include different frame rate options. As will be appreciated, when a user of AT A is speaking, AT A transmits higher-rate frames than when the user of AT A is not speaking and AT A is transmitting silence frames. The application server 170 includes a media control complex (MCC) 172 module that handles the receipt of a media stream from floor-holders, and the transcoding of an output stream to one or more 'listening' group members to the group communication session. In other words, the MCC module 172 replicates and re-broadcasts the frames within RTP packets from AT A to each of ATs B . . . E. Accordingly, a series of frame transmissions from AT A that are received at the MCC module 172 of the application server 170 may be represented as follows:

TABLE 2

| Media Frames arriving at the MCC from AT A at 't' interval for Half-Duplex | | | | | | | | | |
|---|---|---|---|---|---|---|---|---|---|
| 10t | 9t | 8t | 7t | 6t | 5t | 4t | 3t | 2t | T |

| | 10t | 9t | 8t | 7t | 6t | 5t | 4t | 3t | 2t | T |
|---|---|---|---|---|---|---|---|---|---|---|
| A | ■ ½ | ■ ½ | ☐ ⅛ | ☐ ⅛ | ■ ½ | ■ ½ | ☐ ⅛ | ■ ½ | ☐ ⅛ | ■ ½ |
| B | — | — | — | — | — | — | — | — | — | — |
| C | — | — | — | — | — | — | — | — | — | — |
| D | — | — | — | — | — | — | — | — | — | — |
| E | — | — | — | — | — | — | — | — | — | — | wherein time intervals 10t . . . T each include one frame (e.g., RTP packet) having a given data-rate from AT A. It may be assumed that the ■½ frames correspond to data frames (e.g., including voice data), whereas the ☐ ⅛ correspond to silence frames. However, it is appreciated that it is at least possible for a ■½ frame to include a limited amount of noise, similar to a silence frame. Also, because FIG. 4A is a half-duplex group communication session, it is noted that Table 2 (above) indicates that AT A is transmitting frames (e.g., within one or more RTP packets), whereas ATs B . . . E are not transmitting any packets. The frames (e.g., RTP packets) illustrated in Table 2 correspond to an input stream of packets or frames that are received at the application server 170.

As noted above, the MCC module 172 receives the input stream as illustrated above in Table 2, and generates or transcodes an output stream that is transmitted to ATs B . . . E. Accordingly, based on Table 2, the output stream generated by the MCC module 172 of the application server 170 may be configured as follows:

TABLE 3

| Media Frames in the output stream from the MCC to ATs B . . . E for Half-Duplex | | | | | | | | | |
|---|---|---|---|---|---|---|---|---|---|

| | 10t | 9t | 8t | 7t | 6t | 5t | 4t | 3t | 2t | T |
|---|---|---|---|---|---|---|---|---|---|---|
| A | — | — | — | — | — | — | — | — | — | — |
| B | ■ ½ | ■ ½ | ☐ ⅛ | ☐ ⅛ | ■ ½ | ■ ½ | ☐ ⅛ | ■ ½ | ☐ ⅛ | ■ ½ |
| C | ■ ½ | ■ ½ | ☐ ⅛ | ☐ ⅛ | ■ ½ | ■ ½ | ☐ ⅛ | ■ ½ | ☐ ⅛ | ■ ½ |

TABLE 3-continued

Media Frames in the output stream from the
MCC to ATs B . . . E for Half-Duplex

|   | 10t | 9t | 8t | 7t | 6t | 5t | 4t | 3t | 2t | T |
|---|---|---|---|---|---|---|---|---|---|---|
| D | ■1/2 | ■1/2 | □1/8 | □1/8 | ■1/2 | ■1/2 | □1/8 | ■1/2 | □1/8 | ■1/2 |
| E | ■1/2 | ■1/2 | □1/8 | □1/8 | ■1/2 | ■1/2 | □1/8 | ■1/2 | □1/8 | ■1/2 |

As shown in Table 3 (above), the output stream is configured such that AT A's frame transmissions are not transmitted back to AT A, but are rather transmitted to ATs B . . . E in Table 2, above.

As the output stream is generated by the MCC module 172, the application server 170 transmits RTP packets including output frames from the output stream to ATs B . . . E, 430, as a series of group messages, and ATs B . . . E monitor the group messages for the group communication session, 435 and 440. The group communication session then continues for a period of time, until a user of AT A determines to give up the floor, 445. 445 can correspond to an explicit instruction from AT A to give up the floor, or based on a period of inactivity from AT A (i.e., too many silence frames).

After determining AT A has given up the floor to the group communication session, the application server 170 sends a floor-release message to ATs B . . . E, 450. Assume that a user of AT B and at least one of ATs C . . . E determine to attempt to gain control of the floor, and send floor request messages to the application server 170, 455 and 460. The application server 170 thereby receives multiple floor request messages, and evaluates priority levels of the ATs requesting the floor to determine the AT that will next be granted the floor. For example, based on the type of group communication session, the RAN 120 may evaluate one or more priority tables maintained at the RAN 120, and may grant the floor to a highest-priority AT from among the ATs requesting the floor. For example, the priority tables may be configured as follows:

TABLE 4

Priority Tables to Evaluate Floor Requests

| Direct Calls | | Adhoc Calls | | Closed Group Calls | | Closed Chat room Calls | |
|---|---|---|---|---|---|---|---|
| User | Priority | User | Priority | User | Priority | User | Priority |
| A | 7 | A | 7 | A | 2 | A | 2 |
| B | 7 | B | 7 | B | 5 | B | 5 |
| C | 7 | C | 7 | C | 7 | C | 7 |
| D | 7 | D | 7 | D | 1 | D | 1 |
| E | 7 | E | 7 | E | 3 | E | 3 |

In 465, assume that the application server 170 determines AT B has the highest priority level from among the requesting AT for the call-type of the group communication session, and the application server 170 sends a floor-grant message to AT B. Next, AT B plays a tone to notify a user of AT B that AT B now has the floor, and AT B begins transmitting frames (e.g., data frames, silence frames, etc.) within one or more RTP packets to the application server 170, 470, which are then converted into an output stream by the MCC module 172 and re-transmitted to ATs A and C . . . E, 475. It will be appreciated that 470 and 475 are performed in the same manner as 425 and 430 as described above with respect to AT A, and as such 470 and 475 will not be described further for the sake of brevity.

As is characteristic of a half-duplex session, certain ATs in the group communication session of FIG. 4A only transmit frames (e.g., within RTP packets), while other ATs in the group communication session only receive frames (e.g., within RTP packets). An alternative to the process of FIG. 4A is a full-duplex group communication session, which is described below with respect to FIG. 4B. In a full-duplex session, each participant to the session can both transmit and receive frames (e.g., within RTP packets).

Figure 4B:
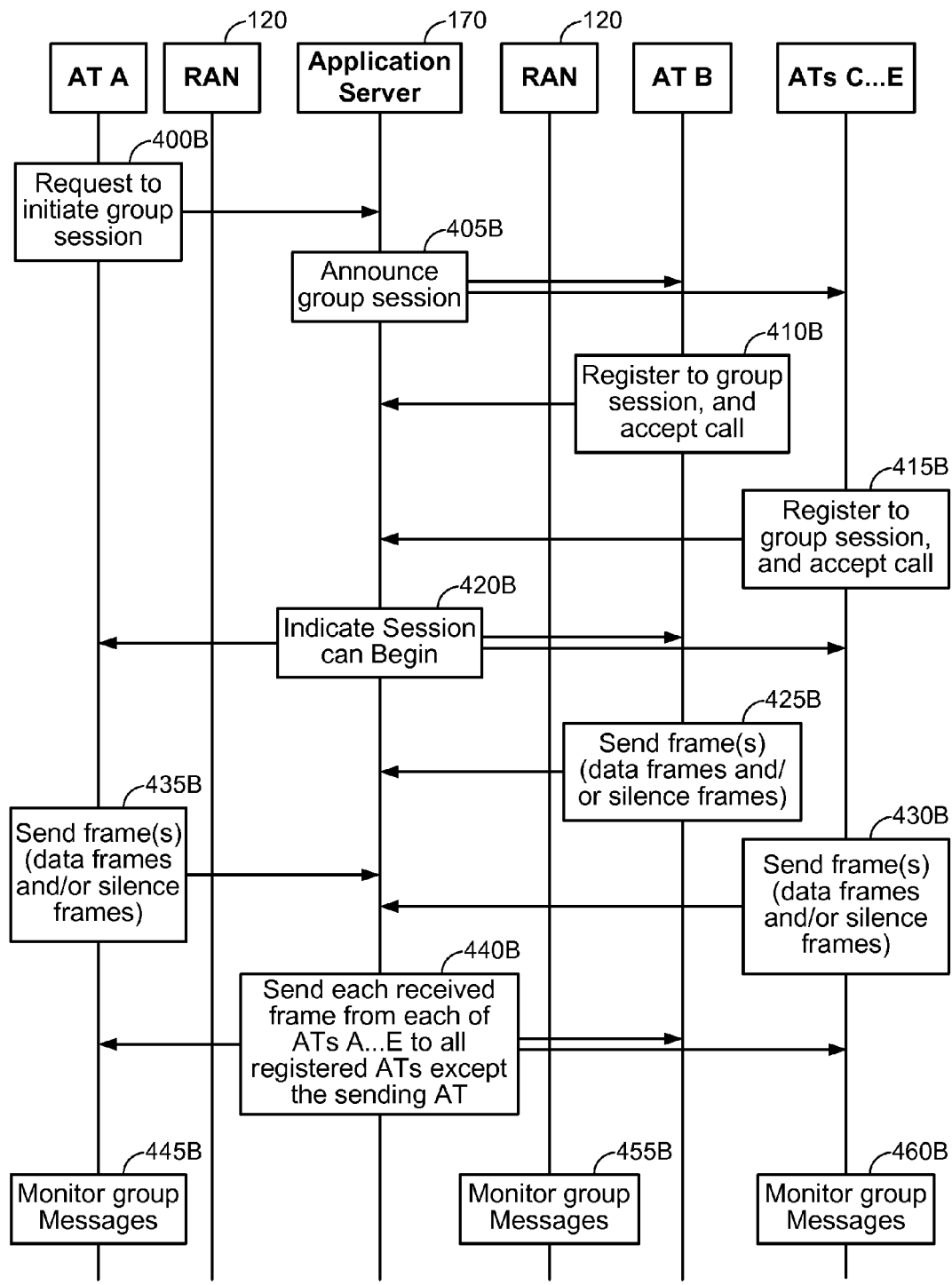
FIG. 4B illustrates a conventional full-duplex group communication session process.

FIG. 4B illustrates a conventional full-duplex group communication session (e.g., a call, a data transport session, etc.) process. As in FIG. 4A, the group communication session of FIG. 4B may correspond to a group communication session supported by IP multicasting protocols, or IP unicasting protocols. Referring to FIG. 4B, 400B through 415B correspond to 400 through 415 of FIG. 4A, and as such will not be discussed further for the sake of brevity.

In 420B, instead of granting the floor to the session initiator (i.e., AT A), the application server 170 sends a message to each AT that has joined the group communication session indicating that the session can begin, 420B. Upon receiving the message 420B, any of ATs A . . . E can begin speaking and thereby send data frames, or else can remain silent and send silence frames, 425B, 430B, 435B.

An example of the input stream from ATs A . . . E (e.g., the frames included within RTP packets from ATs A . . . E for particular timeslots) that are received at the MCC module 172 of the application server 170 may be represented as follows:

TABLE 5

Media Frames arriving at the MCC from ATs
A . . . E at 't' interval for Full-Duplex

|   | 10t | 9t | 8t | 7t | 6t | 5t | 4t | 3t | 2t | T |
|---|---|---|---|---|---|---|---|---|---|---|
| A | ■1/2 | ■1/2 | ■1/2 | ■1/2 | ■1/2 | ■1/2 | ■1/2 | ■1/2 | ■1/2 | ■1/2 |
| B | □1/8 | □1/8 | □1/8 | □1/8 | □1/8 | □1/8 | □1/8 | □1/8 | □1/8 | □1/8 |
| C | □1/8 | □1/8 | □1/8 | □1/8 | □1/8 | □1/8 | □1/8 | □1/8 | □1/8 | □1/8 |
| D | □1/8 | □1/8 | □1/8 | □1/8 | □1/8 | □1/8 | □1/8 | □1/8 | □1/8 | □1/8 |
| E | □1/8 | □1/8 | □1/8 | □1/8 | □1/8 | □1/8 | □1/8 | □1/8 | □1/8 | □1/8 |

Referring to Table 5 (above), each of ATs A . . . E is transmitting frames over timeslots 10t . . . T at a given data rate. In particular, AT A is sending a series of half-rate frames (e.g., which indicates that a user of AT A is likely speaking to ATs B . . . E, and sending voice data), while ATs B . . . E are sending a series of ⅛th rate frames (e.g., which indicates that the users of ATs B . . . E are likely listening to AT A, have walked away from their phones, etc.).

in Table 5 (above), and then generates or transcodes output streams that are transmitted to ATs A . . . E (e.g., which are each different because each output stream omits the frames of the input stream received from the target in order to reduce feedback). Accordingly, based on Table 5 (above), the output stream generated by the MCC module 172 of the application server 170 over timeslots 10t . . . T may be configured as follows:

TABLE 6

Media Frames in the output streams from the MCC to ATs A . . . E for Full-Duplex

| | | 10t | 9t | 8t | 7t | 6t | 5t | 4t | 3t | 2t | T |
|---|---|---|---|---|---|---|---|---|---|---|---|
| A | | ☐1/8 (B) | ☐1/8 (B) | ☐1/8 (B) | ☐1/8 (B) | ☐1/8 (B) | ☐1/8 (B) | ☐1/8 (B) | ☐1/8 (B) | ☐1/8 (B) | ☐1/8 (B) |
| | | ☐1/8 (C) | ☐1/8 (C) | ☐1/8 (C) | ☐1/8 (C) | ☐1/8 (C) | ☐1/8 (C) | ☐1/8 (C) | ☐1/8 (C) | ☐1/8 (C) | ☐1/8 (C) |
| | | ☐1/8 (D) | ☐1/8 (D) | ☐1/8 (D) | ☐1/8 (D) | ☐1/8 (D) | ☐1/8 (D) | ☐1/8 (D) | ☐1/8 (D) | ☐1/8 (D) | ☐1/8 (D) |
| | | ☐1/8 (E) | ☐1/8 (E) | ☐1/8 (E) | ☐1/8 (E) | ☐1/8 (E) | ☐1/8 (E) | ☐1/8 (E) | ☐1/8 (E) | ☐1/8 (E) | ☐1/8 (E) |
| B | | ■1/2 (A) | ■1/2 (A) | ■1/2 (A) | ■1/2 (A) | ■1/2 (A) | ■1/2 (A) | ■1/2 (A) | ■1/2 (A) | ■1/2 (A) | ■1/2 (A) |
| | | ☐1/8 (C) | ☐1/8 (C) | ☐1/8 (C) | ☐1/8 (C) | ☐1/8 (C) | ☐1/8 (C) | ☐1/8 (C) | ☐1/8 (C) | ☐1/8 (C) | ☐1/8 (C) |
| | | ☐1/8 (D) | ☐1/8 (D) | ☐1/8 (D) | ☐1/8 (D) | ☐1/8 (D) | ☐1/8 (D) | ☐1/8 (D) | ☐1/8 (D) | ☐1/8 (D) | ☐1/8 (D) |
| | | ☐1/8 (E) | ☐1/8 (E) | ☐1/8 (E) | ☐1/8 (E) | ☐1/8 (E) | ☐1/8 (E) | ☐1/8 (E) | ☐1/8 (E) | ☐1/8 (E) | ☐1/8 (E) |
| C | | ■1/2 (A) | ■1/2 (A) | ■1/2 (A) | ■1/2 (A) | ■1/2 (A) | ■1/2 (A) | ■1/2 (A) | ■1/2 (A) | ■1/2 (A) | ■1/2 (A) |
| | | ☐1/8 (B) | ☐1/8 (B) | ☐1/8 (B) | ☐1/8 (B) | ☐1/8 (B) | ☐1/8 (B) | ☐1/8 (B) | ☐1/8 (B) | ☐1/8 (B) | ☐1/8 (B) |
| | | ☐1/8 (D) | ☐1/8 (D) | ☐1/8 (D) | ☐1/8 (D) | ☐1/8 (D) | ☐1/8 (D) | ☐1/8 (D) | ☐1/8 (D) | ☐1/8 (D) | ☐1/8 (D) |
| | | ☐1/8 (E) | ☐1/8 (E) | ☐1/8 (E) | ☐1/8 (E) | ☐1/8 (E) | ☐1/8 (E) | ☐1/8 (E) | ☐1/8 (E) | ☐1/8 (E) | ☐1/8 (E) |
| D | | ■1/2 (A) | ■1/2 (A) | ■1/2 (A) | ■1/2 (A) | ■1/2 (A) | ■1/2 (A) | ■1/2 (A) | ■1/2 (A) | ■1/2 (A) | ■1/2 (A) |
| | | ☐1/8 (B) | ☐1/8 (B) | ☐1/8 (B) | ☐1/8 (B) | ☐1/8 (B) | ☐1/8 (B) | ☐1/8 (B) | ☐1/8 (B) | ☐1/8 (B) | ☐1/8 (B) |
| | | ☐1/8 (C) | ☐1/8 (C) | ☐1/8 (C) | ☐1/8 (C) | ☐1/8 (C) | ☐1/8 (C) | ☐1/8 (C) | ☐1/8 (C) | ☐1/8 (C) | ☐1/8 (C) |
| | | ☐1/8 (E) | ☐1/8 (E) | ☐1/8 (E) | ☐1/8 (E) | ☐1/8 (E) | ☐1/8 (E) | ☐1/8 (E) | ☐1/8 (E) | ☐1/8 (E) | ☐1/8 (E) |
| E | | ■1/2 (A) | ■1/2 (A) | ■1/2 (A) | ■1/2 (A) | ■1/2 (A) | ■1/2 (A) | ■1/2 (A) | ■1/2 (A) | ■1/2 (A) | ■1/2 (A) |
| | | ☐1/8 (B) | ☐1/8 (B) | ☐1/8 (B) | ☐1/8 (B) | ☐1/8 (B) | ☐1/8 (B) | ☐1/8 (B) | ☐1/8 (B) | ☐1/8 (B) | ☐1/8 (B) |
| | | ☐1/8 (C) | ☐1/8 (C) | ☐1/8 (C) | ☐1/8 (C) | ☐1/8 (C) | ☐1/8 (C) | ☐1/8 (C) | ☐1/8 (C) | ☐1/8 (C) | ☐1/8 (C) |
| | | ☐1/8 (D) | ☐1/8 (D) | ☐1/8 (D) | ☐1/8 (D) | ☐1/8 (D) | ☐1/8 (D) | ☐1/8 (D) | ☐1/8 (D) | ☐1/8 (D) | ☐1/8 (D) |

Returning to FIG. 4B, in 440B, the MCC module 172 of the application server 170 includes each of the frames from the input streams at each time interval t, de jitters the aggregated media stream, and then generates an output stream that includes all the media content from each of ATs A . . . E for that time interval. The application server 170 then sends the resultant media stream to each of ATs A . . . E as a series of aggregated frames within one or more RTP packets. However, it is appreciated that each of ATs A . . . E receives an aggregated media stream containing frames from all session participants, except itself, to avoid feedback problems. Thus, AT A receives an output stream composed of aggregated media from ATs B . . . E, AT B receives an output stream composed of aggregated media from ATs A and C . . . E, and so on.

As noted above, the MCC module 172 receives the frames from ATs A . . . E (i.e., the input stream) as illustrated above As shown in Table 6 (above), due to a simplistic brute force forwarding implementation of the group communication session, the aggregated media frames to ATs A . . . E at each timeslot of the output stream has a total data-rate equal to the sum of the data-rates for frames (e.g., or RTP packets) from ATs other than itself.

With respect to the conventional half-duplex implementation for the group communication session in FIG. 4A, it will be appreciated that bandwidth utilization is superior as compared to the full-duplex implementation for the group communication session of FIG. 4A. However, the inability of ATs to transmit to the group can, at times, be problematic (e.g., if a current floor-holder does not give up the floor and keeps on talking about irrelevant issues). In half-duplex, the current floor-holder would be oblivious to the sentiment of the group because the floor-holder cannot receive feedback from the other group-members until the floor is released.

This problem does not occur in the full-duplex implementation of FIG. 4B. However, the bandwidth requirements of a full-duplex implementation are high, because for N group communication session participants, each participant receives an aggregated output stream having N−1 combined media flows, which consumes a relatively high amount of bandwidth. Also, aggregating a high number of media frames to form the media frames of the output stream can be processing intensive at the application server 170. Also, the MCC module 172 of the application server 170 does not distinguish between media flows. Thus, silence frames are granted the same priority as data frames in the output stream when the frames contend for the same timeslot in the output stream.

Accordingly, embodiments which will now be described in more detail are directed to a hybrid implementation that includes certain properties of both half-duplex and full-duplex implementations. As will be described below in more detail, a plurality of participants to a group communication session (e.g., all participants) can both transmit and receive frames (e.g., within RTP packets), as in full-duplex. However, the MCC module 172 is configured to select one or more of the incoming media streams for output to each group communication session participant, such that any given output frame in the output stream to a particular group communication session participant (other than the selected participant(s)) includes media content from only the selected participant(s). If only one media stream is selected, the output stream is similar to half-duplex (e.g., which increases an efficiency of bandwidth utilization). If more than one and less than all input media streams are selected, the output media stream is similar to full-duplex for the selected subset of ATs whose frames were selected, while bandwidth utilization is increased because not all of the frames are included in the output stream as in full-duplex (e.g., although in at least one embodiment, it is at least possible that all frames are selected). The selection mechanism with regard to how the MCC module 172 generates the output stream for the group communication session participants will be described below in detail.

Below, embodiments of the present invention are described with respect to full-rate frames, half-rate frames, and ⅛th rate frames. A set of frame resets that is inclusive of the above-noted frame rates is specific to an EVRC-A Vocoder. Other vocoders, such as EVRC-B and/or 4G, can include a ¼ rate frame as part of the frame rate set. While references below are generally made to EVRC-A, it will be readily apparent how these embodiments can be modified to accommodate other vocoders that include different frame rate options.

Further, embodiments of the invention described below refer to RTP packets and frames (e.g., silence frames, data frames, etc.) interchangeably in certain sections. However, it is appreciated that RTP packets can actually include multiple frames. It will thereby be appreciated that certain references to RTP packets made with the assumption that RTP packets include one (1) frame can be modified in other embodiments of the invention such that the processes disclosed herein are frame specific, and not necessarily RTP packet specific. In other words, where a frame selection is made for a first timeslot and then a second timeslot, it is possible that one or more of the frames available for selection in the first and second timeslots were actually received in the same RTP packet, and in this case the selection would be frame-specific and not packet-specific. Generally, the embodiments of the invention are directed to frame mixing and selection, and RTP packets are merely the example mechanism that carries one (or more) of the frames.

Figure 5A:
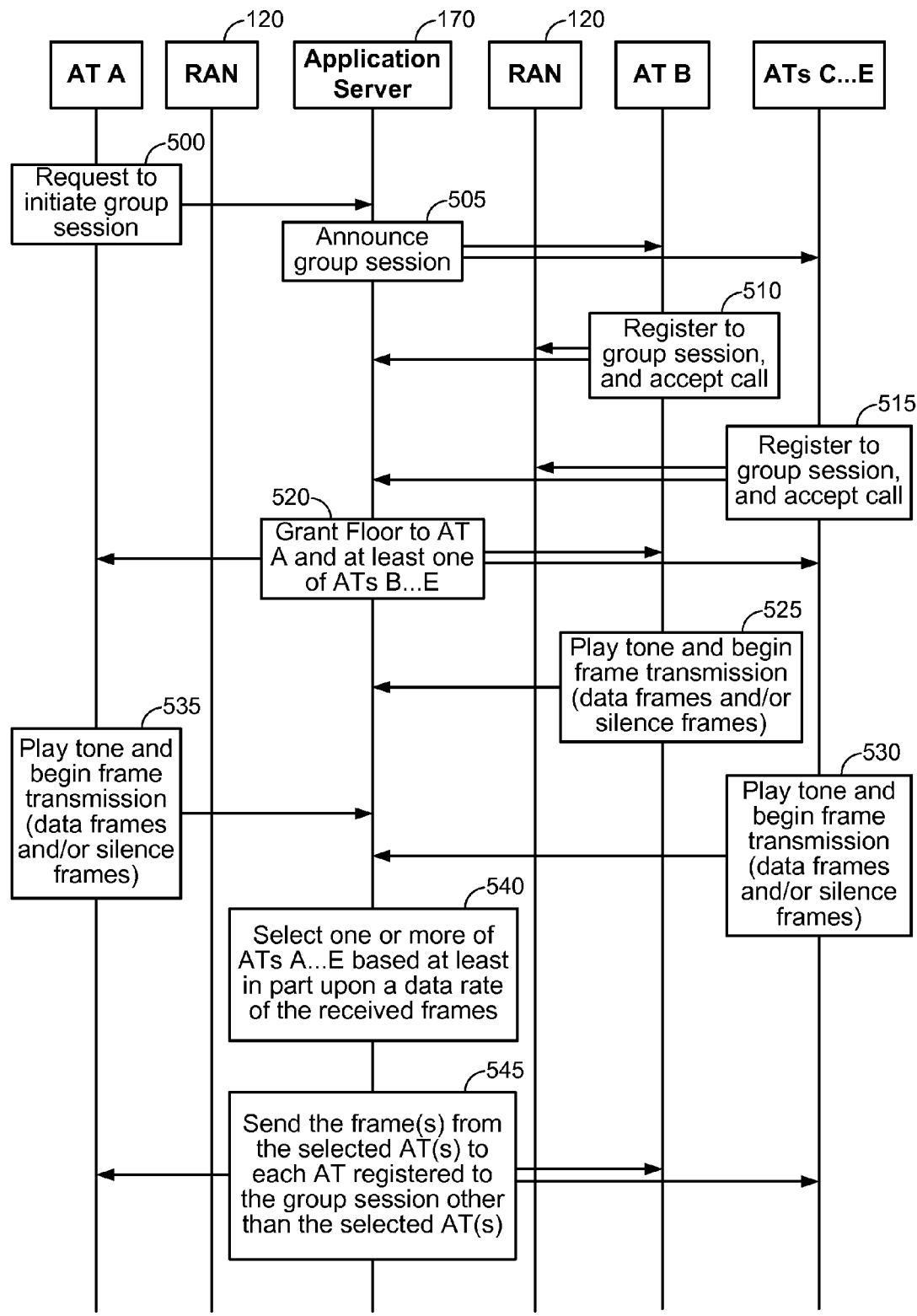
FIG. 5A illustrates a group communication session process according to an embodiment of the invention.

Accordingly, FIG. 5A illustrates a group communication session (e.g., a call, a transport session, etc.) process according to an embodiment of the invention. In particular, FIG. 5A illustrates the group communication session process at a relatively high-level, which will be followed by more-detailed examples of portions of the high-level process illustrated in FIG. 5A. The group communication session of FIG. 5A may correspond to a group communication session supported by IP multicasting protocols, or IP unicasting protocols. In IP multicasting, a downlink broadcast channel (BCH) carries a single multicast flow within one or more sectors to reach each 'listening' multicast group member, while a separate scheduling message (e.g., a broadcast overhead message (BOM)) is transmitted on a downlink control channel that indicates how the multicast group members can tune to the downlink BCH. In IP unicasting, each group message is transmitted to each group communication session participant, or multicast group member, as a separate unicast message addressed to each group member individually.

Referring to FIG. 5A, in 500, a given AT ("AT A") sends a request to the application server 170 via the RAN 120 to initiate a group communication session. For example, the group communication session may correspond to a push-to-talk (PTT) or push-to-transfer (PTX) session, and the transmission of the request in 500 may be prompted based on a user of AT A pressing a PTT or PTX button on AT A. The application server 170 receives the group communication session request from AT A, and transmits an announce message in one or more sectors of the wireless communication system 100, 505. At least ATs B . . . E receive the announce message, and determine to join the announced group communication session. Accordingly, ATs B . . . E send a call accept message to the application server 170, and also send a registration message (e.g., BCMCSFlowRegistration message) to the RAN 120 to register to the group communication session, 510 and 515. The call accept message and registration message from each of ATs B . . . E may either be sent within separate messages on a reverse link access channel, or alternatively may be bundled within the same message.

Referring to FIG. 5A, in 520, after receiving the call accept messages from ATs B . . . E, the application server 170 sends floor-grant messages to AT A and at least one of ATs B . . . E. In an example, the application server 170 can be configured to send floor-grant messages to each AT that joins the group communication session. In an alternative example, the application server 170 can be configured to send floor-grant messages to less than all, but more than one, AT that joins the group communication session. Thus, certain ATs may be configured to both send and receive (as in full-duplex), while other ATs may be configured to receive or transmit only (as in half-duplex). Also, instead of floor-grant messages being sent in 520, any type of message may be sent so long as AT A and at least one of ATs B . . . E are capable of both sending group messages to the application server 170, and also receiving group messages from the application server 170.

Accordingly, at each of ATs A . . . E, a tone is played that indicates to a user of each respective AT that the group communication session has begun, and ATs A . . . E begin transmitting frames (e.g., data frames, silence frames, etc., included within one or more RTP packets) at a given data-rate on a reverse link channel to the application server 170, 525, 530, 535.

The application server 170 receives the frames from ATs A . . . E for a given time interval or timeslot, and selects the frame from one or more of ATs A . . . E for transmission upon an output stream to each other of ATs A . . . E, 540. The selection of 540 is performed by the MCC module 172 at the application server 170, and is based at least in part upon a data-rate of the frames in the input stream for a given timeslot at the MCC module 172 from ATs A . . . E. The selection of 540 will be described in more detail below. After making the selection in 540, the application server 170 sends the selected frame(s) to each AT, except the AT(s) from which the selected frame(s) were received, in 545. While not shown explicitly within FIG. 5A, the application server 170 may also send a frame from a non-selected AT to the AT(s) associated with the selected frame(s), as will be described in more detail below.

The selection of 540 may be performed in a number of ways, examples of which will now be described with respect to FIGS. 5B through 5D. For example, assume that ATs A . . . E have priority levels as defined by Table 2 (above) for direct calls, adhoc calls, closed group calls and closed chat room calls. Under this assumption, it will be appreciated that if the group communication session established in FIG. 5A is a direct call or an adhoc call, the priority of ATs A . . . E is the same (e.g., although this is not necessarily the case for all direct calls or adhoc calls), whereas for closed group calls or close chat room calls, the priority levels of ATs A . . . E are not necessarily the same.

Figure 5B:
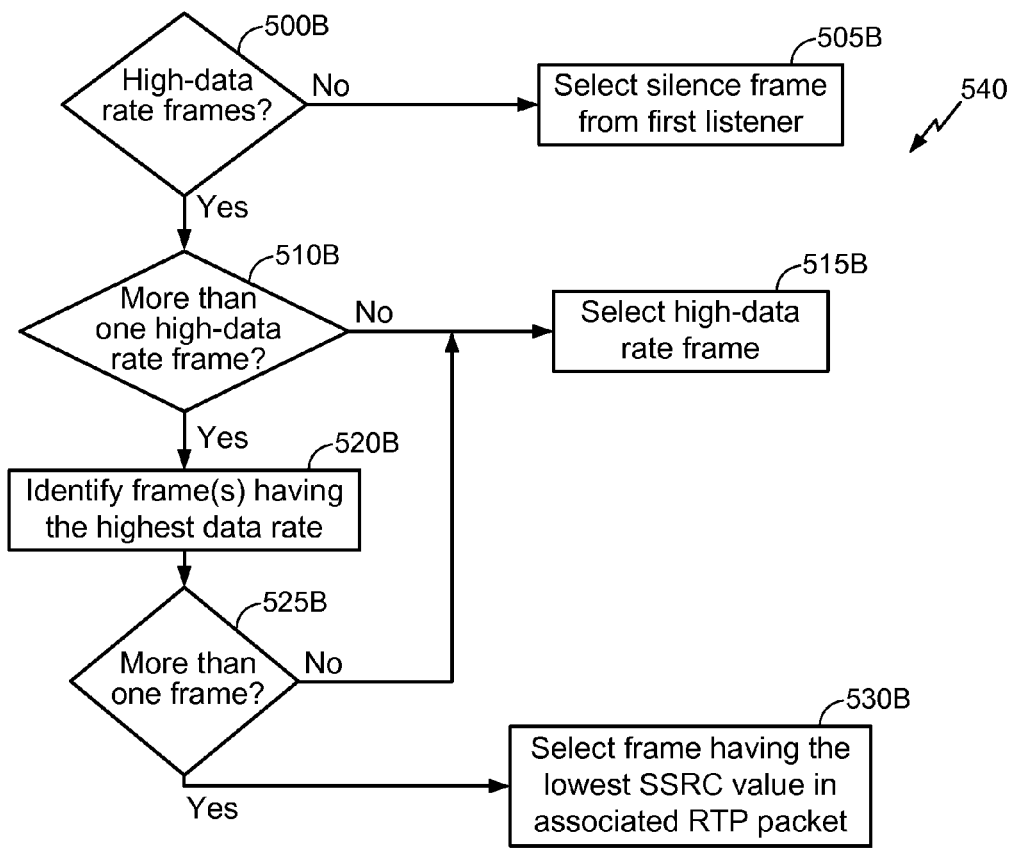
FIG. 5B illustrates an example of frame selection where each group communication session participant has the same priority level according to an embodiment of the invention.

Accordingly, FIG. 5B illustrates an example of the frame selection of 540 performed at the application server 170 where each group communication session participant has the same priority level according to an embodiment of the invention. Referring to FIG. 5B, the application server 170 determines whether any high-data-rate frames (e.g., frames having a higher data-rate than a ⅛th rate) are received within a given time interval or timeslot from ATs A . . . E, 500B. If no high data-rate frames are determined to be present, the MCC module 172 of the application server 170 selects according to a given selection rule. For example, the given selection rule can correction to a selection of a silence frame from a first listener (e.g., a first of ATs B . . . E to have accepted the call announce message from 505 of FIG. 5A). It will be appreciated that the selection of 505B is somewhat arbitrary, and could be configured in many different ways (e.g., the second listener's silence frame could be selected, the originator's silence frame could be selected, etc.) because irrespective of which silence frame is re-transmitted on the output streams from the application server 170, the output streams will still carry a silence frame.

Otherwise, if at least one frame from ATs A . . . E is determined to be a data frame (e.g., the frame has a data-rate higher than ⅛th), then the MCC module 172 determines if more than one high data-rate frame is present, 510B. If only one high data-rate frame is determined to be present from ATs A . . . E in a given timeslot in 510B, the high data-rate frame is selected, 515B. Otherwise, if multiple high data-rate frames are determined to be present in 510B, the MCC module 172 determines which of the multiple high data-rate frames has the highest data-rate, 520B. The MCC module 172 then determines if a single frame is present with a data-rate (e.g., a full-rate frame) that is higher than the other high data-rate frames (e.g., half-rate frames), 525B. In another embodiment, the MCC module 172 could choose multiple high data-rate frames and mix (e.g., in a digital processing sense) the high-data rate frames to produce a single, mixed frame that can then be selected for transmission. This selection of frames to be mixed can be based on the available processing power at the MCC module 172 (e.g., fewer frames can be selected if the available processing power is low, more frames can be selected if the available processing power is high, etc.) and/or the number of target ATs that can be serviced using the single, mixed frame (e.g., if a high number of target ATs will be receiving the same mixed frame, then the per-AT processing consumption will be relatively low such that more processing power will be allocated to the mixing of this type of 'popular' mixed frame, whereas fewer frames may be selected for mixing if a relatively small number of ATs will be receiving the mixed frame, etc.). If there is a single frame that has a data-rate that is higher than all other frames, the highest data-rate frame is selected in 515B. Otherwise, the MCC module 172 selects, from among the frames having the highest data-rate (e.g., multiple full-rate frames, multiple half-rate frames, etc.) based on another given selection rule (e.g., which may be the same as the given selection rule noted above, or different). For example, the another given selection rule may correspond to a selection of the frame whose RTP packet has a lowest SSRC value. It will be appreciated that the selection of 530B is somewhat arbitrary, and could be configured in many different ways (e.g., the frame whose RTP packet has a highest SSRC packet could be selected, etc.).

Figure 5C:
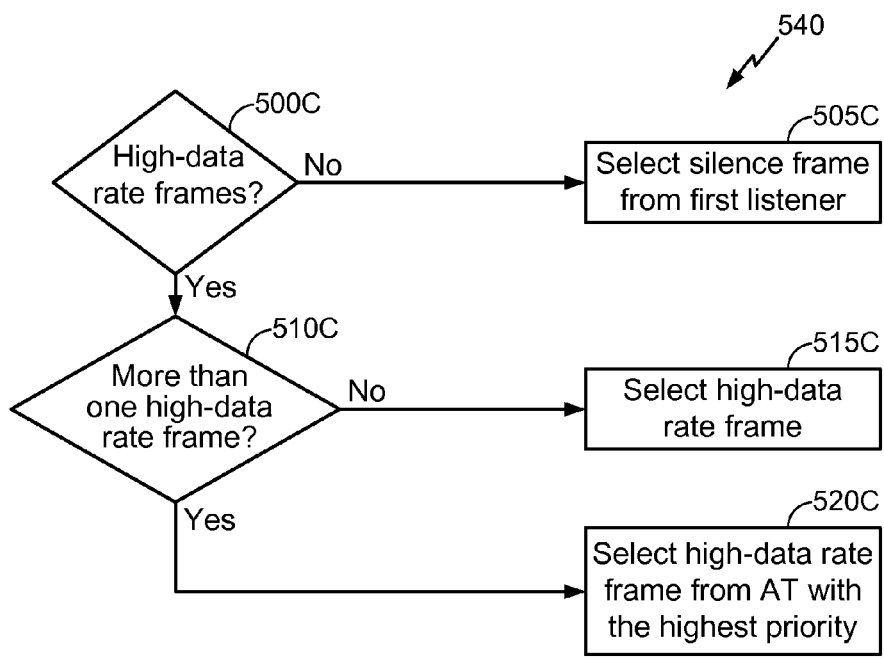
FIG. 5C illustrates an example of frame selection where two or more group communication session participants have different priority levels according to an embodiment of the invention.

Turning to FIG. 5C, FIG. 5C illustrates an example of the frame selection of 540 performed at the application server 170 where two or more group communication session participants have different priority levels according to an embodiment of the invention. Referring to FIG. 5C, the application server 170 determines whether any high-data-rate frames (e.g., frames having a higher data-rate than a ⅛th rate) are received within a given time interval or timeslot from ATs A . . . E, 500C. If no high data-rate frames are determined to be present, the MCC module 172 of the application server 170 selects according to a given selection rule. For example, the given selection rule can correction to a selection of a silence frame from a first listener (e.g., a first of ATs B . . . E to have accepted the call announce message from 505 of FIG. 5A). It will be appreciated that the selection of 505C is somewhat arbitrary, and could be configured in many different ways (e.g., the second listener's silence frame could be selected, the originator's silence frame could be selected, a silence frame of a highest-priority AT as determined from Table 2 (above) could be selected, etc.) because irrespective of which silence frame is re-transmitted on the output streams from the application server 170, the output streams will still carry a silence frame.

Otherwise, if at least one frame from ATs A . . . E is determined to be a data frame (e.g., the frame has a data-rate higher than ⅛th), then the MCC module 172 determines if more than one high data-rate frame is present, 510C. If only one high data-rate frame is determined to be present from ATs A . . . E in a given timeslot in 510C, the high data-rate frame is selected, 515C. Otherwise, if multiple high data-rate frames are determined to be present in 510C, the MCC module 172 selects the high data-rate frame associated with an AT having the highest priority level as specified by Table 2 (above), 520C. While not shown in FIG. 5C, if more than one frame have high data-rates and are associated with ATs having the same, highest priority level, the MCC module 172 may base the selection of 520C on another given selection rule, such as an SSRC number of the RTP packets of the frames, as in 530B of FIG. 5B.

As will be appreciated, FIGS. 5B and 5C represent two relatively simple examples of the selection of 540 of FIG. 5A, and many other different selection algorithms may be implemented in other embodiments of the invention. Also, while not shown in FIGS. 5B and/or 5C, in an alternative embodiment, the processes of FIGS. 5B and/or 5C may select a high data-rate frame from an originator whenever the originator sends a high data-frame, irrespective of other considerations, such as relative priority levels and/or relative data rates (e.g., alternatively, this can be construed as simply granting the originator a highest possible priority level that preempts other considerations). Also, while Table 2 (above) illustrates a static set of priority levels for ATs A . . . E, it will be appreciated that in other embodiments of the invention, the priority levels may be dynamic, and may change during the call. For example, if many different ATs are transmitting high data-rate frames, for fairness, a given AT's priority level may be decremented each time the given AT's frame is selected, and the given AT's priority level may be incremented each time the given AT's frame is not selected. However, there are many different ways the priority levels may be dynamically adjusted, as will be appreciated by one of ordinary skill in the art.

Further, while FIGS. 5B and 5C are directed to a selection algorithm in which a single high-data rate frame is selected (if available), the processes of FIGS. 5B and 5C can be modified such that more than one frame is selected, as will now be described with respect to FIGS. 5D and 5E, respectively.

Figure 5D:
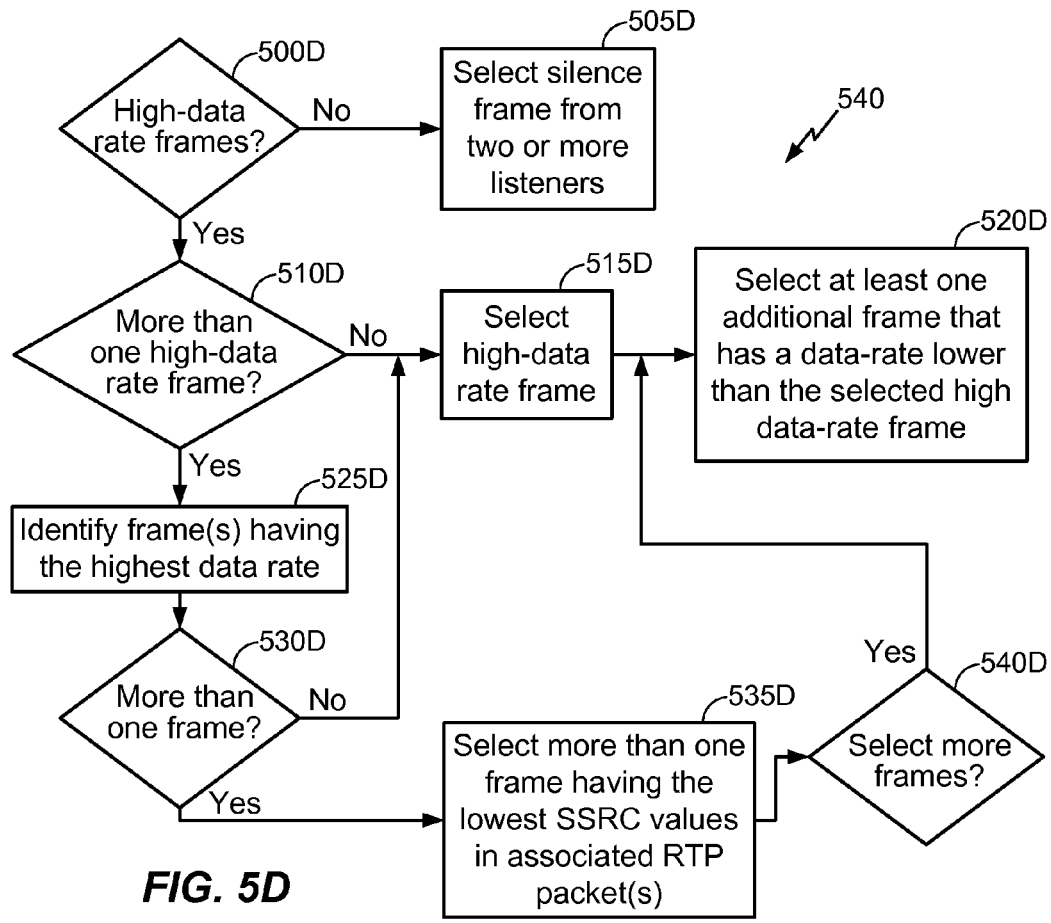
FIG. 5D illustrates a modification of the process of FIG. 5B wherein multiple frames are selected according to an embodiment of the invention.

FIG. 5D illustrates an example of the frame selection of 540 of FIG. 5A performed at the application server 170 where each group communication session participant has the same priority level and where multiple frames (e.g., two or more) are selected according to an embodiment of the invention. In particular, FIG. 5D illustrates a modification to the process of FIG. 5B discussed above such that multiple frames can be selected, instead of a single frame.

Referring to FIG. 5D, the application server 170 determines whether any high-data-rate frames (e.g., frames having a higher data-rate than a ⅛th rate) are received within a given time interval or timeslot from ATs A . . . E, 500D. If no high data-rate frames are determined to be present, the MCC module 172 of the application server 170 selects one or more frames according to a given selection rule. For example, the given selection rule can correction to a selection of silence frames from two or more listeners (e.g., a first and second of ATs B . . . E to have accepted the call announce message from 505 of FIG. 5A). The actual number of frames to be selected (e.g., two, three, etc.) can be determined by an operator of the application server 170.

It will be appreciated that the selection of 505D is somewhat arbitrary, and could be configured in many different ways (e.g., the second and third listener's silence frame could be selected, the originator's silence frame and the first silence frame could be selected, etc.) because irrespective of which silence frames are re-transmitted on the output streams from the application server 170, the output streams will still carry multiple, mixed silence frames.

Otherwise, if at least one frame from ATs A . . . E is determined to be a data frame (e.g., the frame has a data-rate higher than ⅛th), then the MCC module 172 determines if more than one high data-rate frame is present, 510D. If only one high data-rate frame is determined to be present from ATs A . . . E in a given timeslot in 510D, the high data-rate frame is selected, 515D. Then, in 520D, at least one additional frame that has a data-rate lower (e.g., ⅛ rate) than the selected high data-rate frame is also selected based on a given selection rule (e.g., which may be the same as the given selection rule noted above, or different). For example, the another given selection rule may correspond to a selection of 505B and/or 505D, such that one (or more) silence frames from a given number of listeners (e.g., the first listener, the second listener, etc.) are selected in 520D.

Otherwise, if multiple high data-rate frames are determined to be present in 510D, the MCC module 172 determines which of the multiple high data-rate frames has the highest data-rate, 525D. The MCC module 172 then determines if a single frame is present with a data-rate (e.g., a full-rate frame) that is higher than the other high data-rate frames (e.g., half-rate frames), 525D. If there is a single frame that has a data-rate that is higher than all other frames, the highest data-rate frame is selected in 515D, and the process then advances to 520D as discussed above. Otherwise, the MCC module 172 selects all of the frames from among the frames having the highest data-rate (e.g., multiple full-rate frames, multiple half-rate frames, etc.), or if the number of frames required for selection is less than the number of highest data-rate frames, the MCC module 172 selects among the highest data-rates frames based on another given selection rule (e.g., which may be the same as the given selection rule noted above, or different). For example, the given selection rule may correspond to a selection of the two (or more) frames whose RTP packet(s) have the lowest SSRC values. It will be appreciated that the selection of 535D is somewhat arbitrary, and could be configured in many different ways (e.g., the frames whose RTP packet(s) have a highest SSRC packet could be selected, etc.). After the selection of 535D, the MCC module 172 determines whether to select any additional frames, 540D. If so, the processes advances to 520D, as discussed above. Otherwise, the selection process of FIG. 5D is complete for this particular timeslot.

Figure 5E:
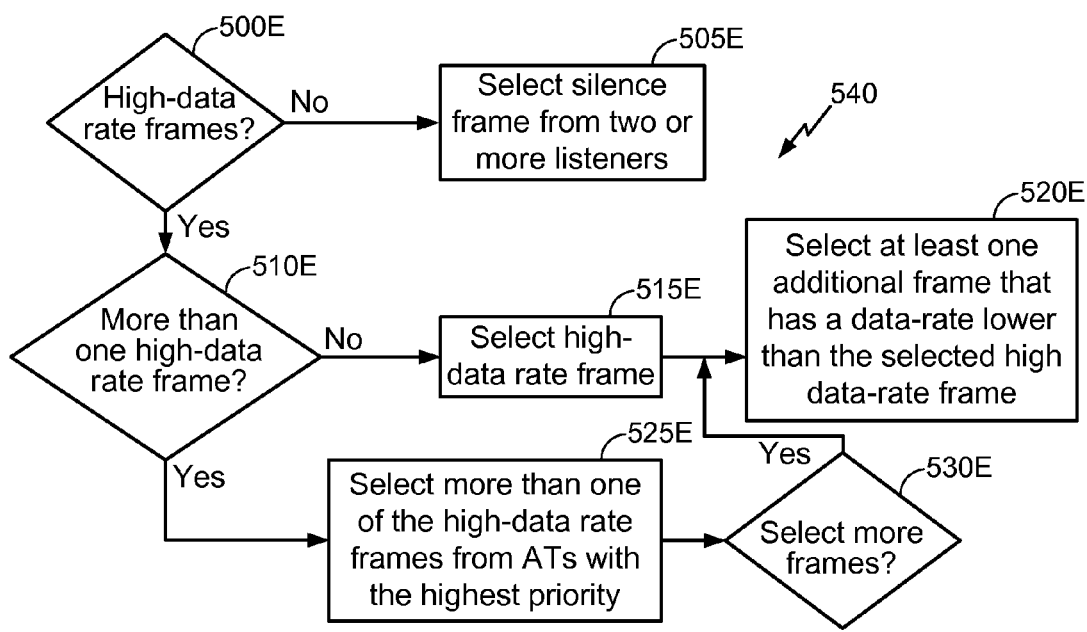
FIG. 5E illustrates a modification of the process of FIG. 5C wherein multiple frames are selected according to an embodiment of the invention.

Turning to FIG. 5E, FIG. 5E illustrates an example of the frame selection of 540 performed at the application server 170 where two or more group communication session participants have different priority levels and where multiple frames (e.g., two or more) are selected according to an embodiment of the invention. In particular, FIG. 5E illustrates a modification to the process of FIG. 5C discussed above such that multiple frames can be selected, instead of a single frame.

Referring to FIG. 5E, the application server 170 determines whether any high-data-rate frames (e.g., frames having a higher data-rate than a ⅛th rate) are received within a given time interval or timeslot from ATs A . . . E, 500E. If no high data-rate frames are determined to be present, the MCC module 172 of the application server 170 selects one or more frames according to a given selection rule. For example, the given selection rule can correction to a selection of 505B, 505D and/or 505E, such that silence frames from two or more listeners are selected (e.g., a first and second of ATs B . . . E to have accepted the call announce message from 505 of FIG. 5A). The actual number of frames to be selected (e.g., two, three, etc.) can be determined by an operator of the application server 170.

It will be appreciated that the selection of 505D is somewhat arbitrary, and could be configured in many different ways (e.g., the second and third listener's silence frame could be selected, the originator's silence frame and the first silence frame could be selected, etc.) because irrespective of which silence frames are re-transmitted on the output streams from the application server 170, the output streams will still carry multiple, mixed silence frames.

Otherwise, if at least one frame from ATs A . . . E is determined to be a data frame (e.g., the frame has a data-rate higher than ⅛th), then the MCC module 172 determines if more than one high data-rate frame is present, 510E. If only one high data-rate frame is determined to be present from ATs A . . . E in a given timeslot in 510E, the high data-rate frame is selected, 515E. Then, in 520E, at least one additional frame that has a data-rate lower (e.g., ⅛ rate) than the selected high data-rate frame is also selected based on a given selection rule (e.g., which may be the same as the given selection rule noted above, or different). For example, the given selection rule may correspond to 520D, discussed above with respect to FIG. 5D, such that one (or more) silence frames from a given number of listeners (e.g., the first listener, the second listener, etc.) are selected in 520E.

Otherwise, if multiple high data-rate frames are determined to be present in 510E, the MCC module 172 selects the high data-rate frames associated with ATs having the highest priority levels as specified by Table 2 (above), 525E. The number of frames which are selected in this manner in 520E can be determined by an operator of the application server 170. While not shown in FIG. 5E, if more frames than are required for selection have high data-rates and are associated with ATs having the same, highest priority level, the MCC module 172 may base the selection of 525E on another given selection rule, such as selecting based on an SSRC number (e.g., highest or lowest) of the RTP packets of the frames, as in 530B of FIG. 5B.

After the selection of 525E, the MCC module 172 determines whether to select any additional frames, 530E. If so, the processes advances to 520E, as discussed above. Otherwise, the selection process of FIG. 5E is complete for this particular timeslot.

As will be appreciated, there are many different possible mechanisms for selecting a subset (e.g., more than one and less than all) of the available frames for a particular timeslot, and FIGS. 5D and 5E merely illustrate two examples of such a selection process.

Figure 7:
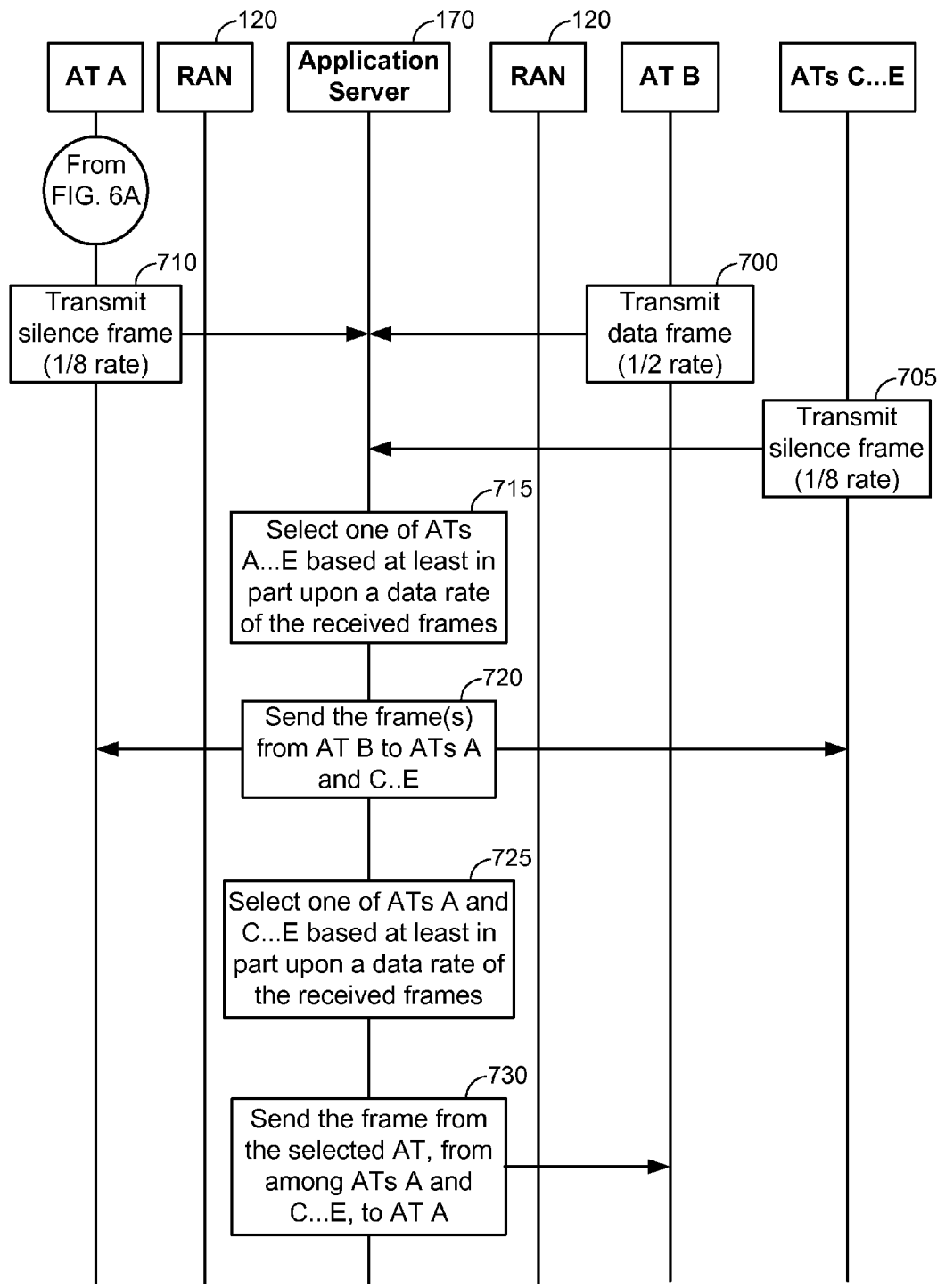
FIG. 7 illustrates a continuation of the process of FIG. 6A in accordance with an embodiment of the invention.
Figure 8:
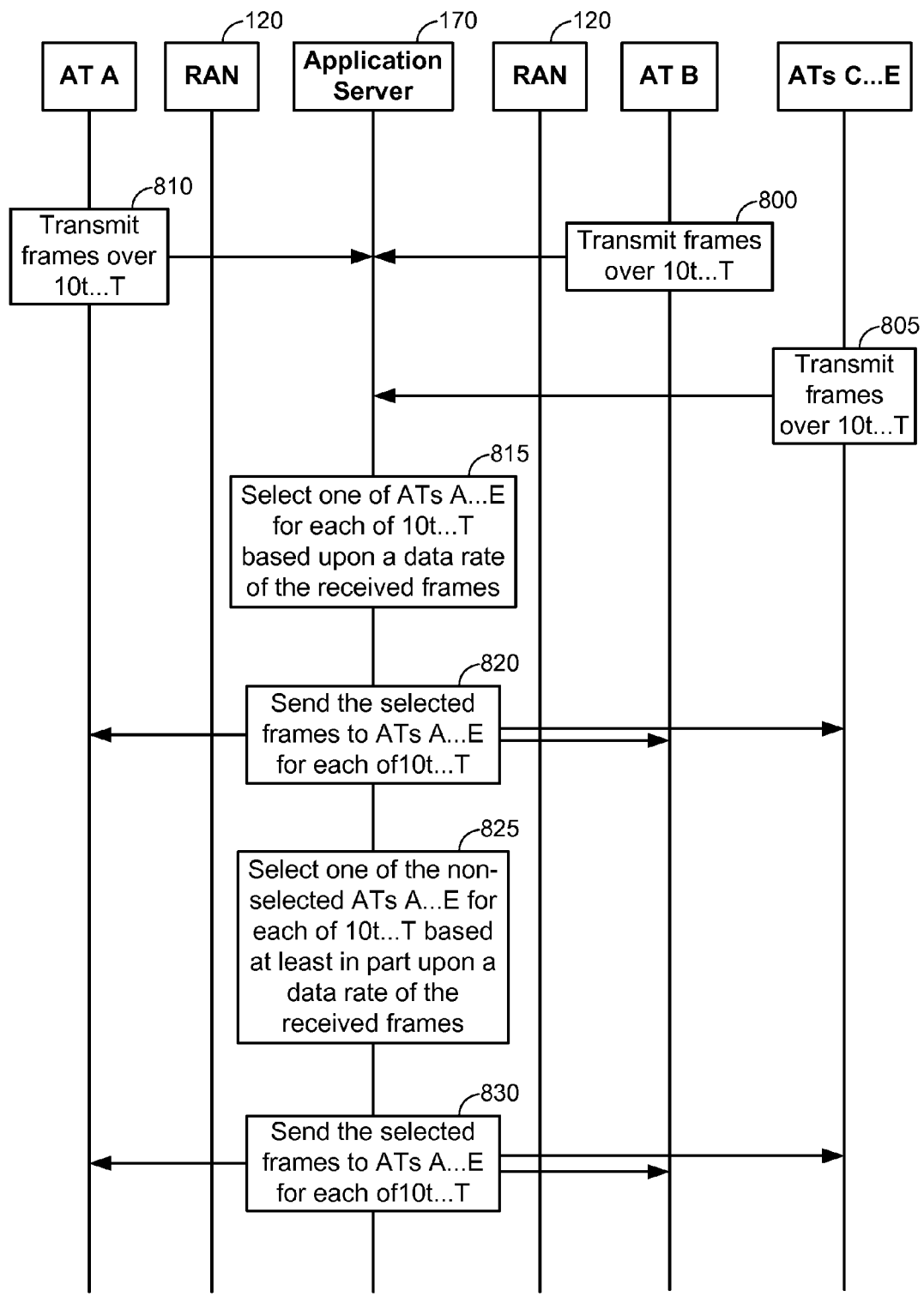
FIG. 8 illustrates the process of FIG. 6A over multiple timeslots in accordance with an embodiment of the invention.

Below, a number of more detailed examples of the high-level group communication session process of FIG. 5A, based on a selection algorithm as illustrated in FIGS. 5B, 5C, 5D and/or 5E, are described with respect to FIGS. 6A through 8. In particular, FIG. 6A and FIGS. 7 through 8 illustrates examples wherein a single frame is selected as in FIGS. 5B and/or 5C, and FIG. 6B illustrates an example wherein multiple frames are selected, as in FIGS. 5D and/or 5E.

Figure 6A:
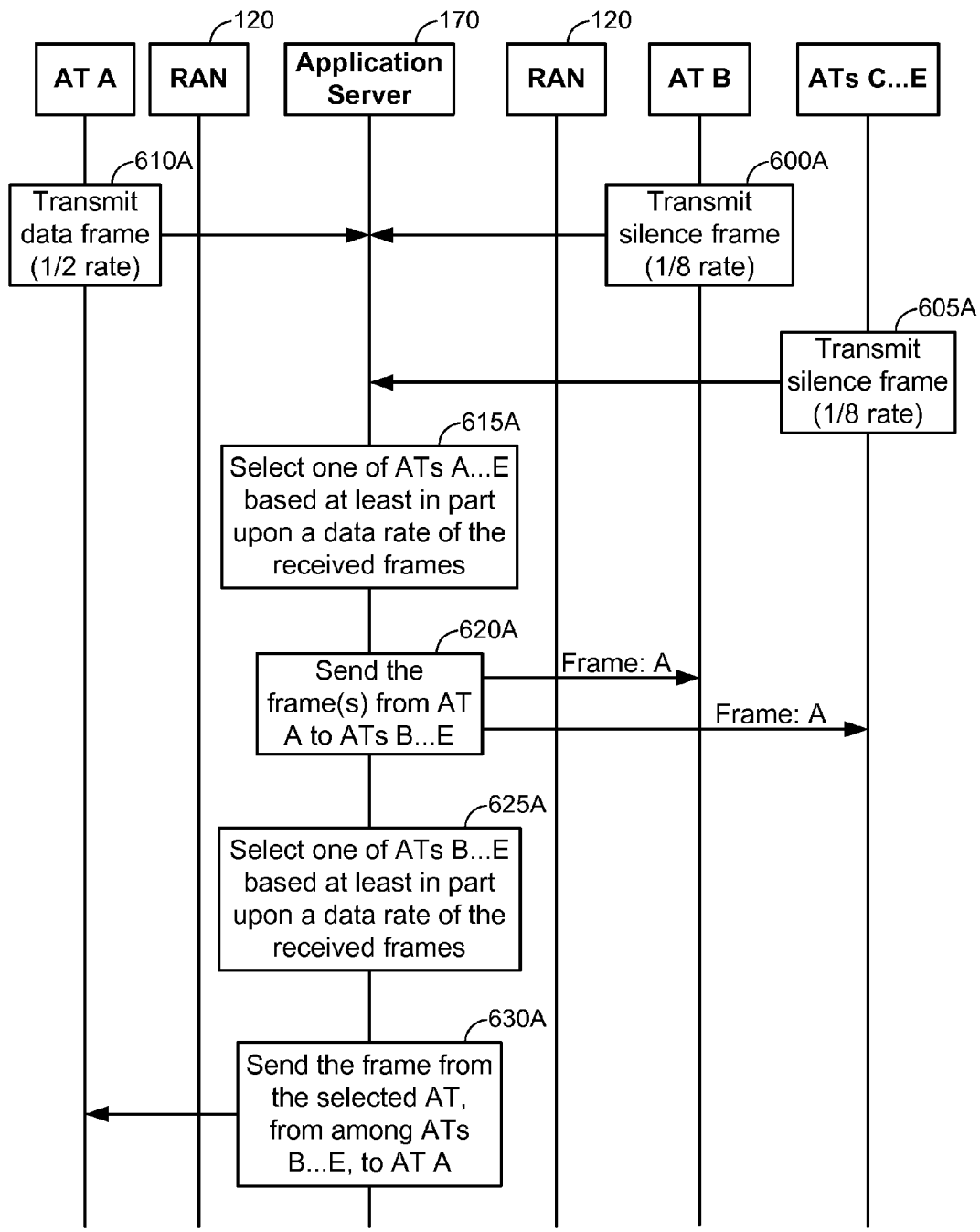
FIG. 6A illustrates the group communication session process of FIG. 5A performed in accordance with the selection process of FIG. 5B or FIG. 5C in accordance with an embodiment of the invention.
Figure 6B:
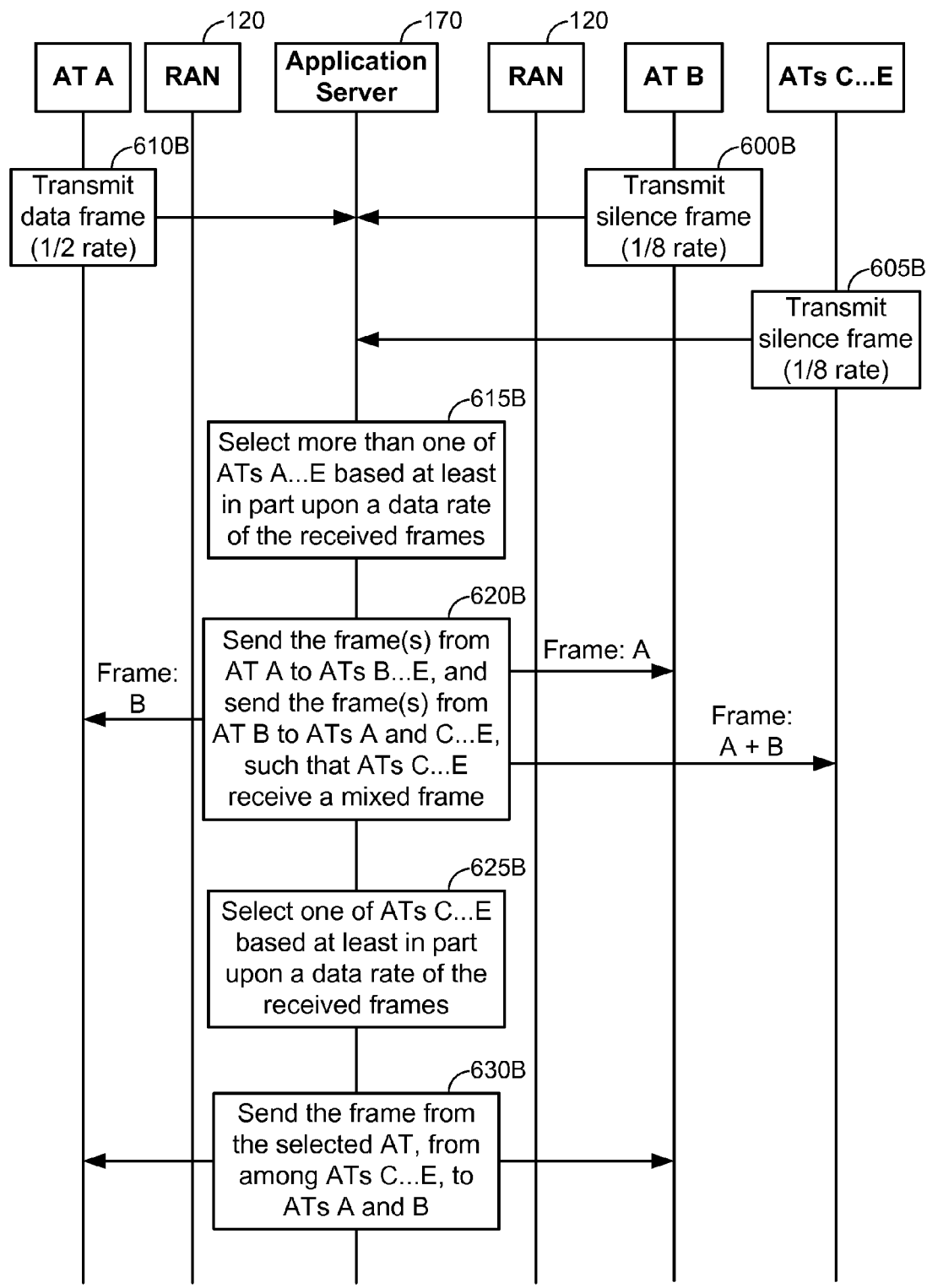
FIG. 6B illustrates the group communication session process of FIG. 5A performed in accordance with the selection process of FIG. 5D or FIG. 5E in accordance with an embodiment of the invention.

Accordingly, FIG. 6A illustrates the group communication session process of FIG. 5A in accordance with an embodiment of the invention. Referring to FIG. 6A, within the same timeslot, AT B transmits a ⅛th rate silence frame, 600A, ATs C . . . E also each transmit ⅛th rate silence frames, 605A, and AT A transmits a half-rate data frame carrying voice data, 610A. Next, in 615A, the MCC module 172 of the application server 170 selects a frame from one of ATs A . . . E for re-transmission upon an output stream to each other AT. In the example of FIG. 6A, because only the frame from AT A has a high data-rate (e.g., in this case, a ½ or half data-rate), AT A is selected in 615. It will be appreciated that AT A would be selected irrespective of the call-type of the group communication session in FIG. 6A, because the selection algorithm of FIG. 5B would select AT A in 515B, whereas the selection algorithm of FIG. 5C would select AT A in 515C. Further, for clarity, it will be appreciated that 600A through 615A of FIG. 6A correspond to 525 through 540, respectively, of FIG. 5A. Assuming the transmissions of 600A through 610A repeat for ten (10) timeslots (i.e., 10t . . . T), the input stream received at the application server 170 in timeslots 10t . . . T may be represented as follows:

TABLE 7

| | Media Frames arriving at the MCC from ATs A . . . E at 't' intervals | | | | | | | | | |
|---|---|---|---|---|---|---|---|---|---|---|
| | 10t | 9t | 8t | 7t | 6t | 5t | 4t | 3t | 2t | T |
| A | ■ 1/2 | ■ 1/2 | ■ 1/2 | ■ 1/2 | ■ 1/2 | ■ 1/2 | ■ 1/2 | ■ 1/2 | ■ 1/2 | ■ 1/2 |
| B | ☐ 1/8 | ☐ 1/8 | ☐ 1/8 | ☐ 1/8 | ☐ 1/8 | ☐ 1/8 | ☐ 1/8 | ☐ 1/8 | ☐ 1/8 | ☐ 1/8 |
| C | ☐ 1/8 | ☐ 1/8 | ☐ 1/8 | ☐ 1/8 | ☐ 1/8 | ☐ 1/8 | ☐ 1/8 | ☐ 1/8 | ☐ 1/8 | ☐ 1/8 |
| D | ☐ 1/8 | ☐ 1/8 | ☐ 1/8 | ☐ 1/8 | ☐ 1/8 | ☐ 1/8 | ☐ 1/8 | ☐ 1/8 | ☐ 1/8 | ☐ 1/8 |
| E | ☐ 1/8 | ☐ 1/8 | ☐ 1/8 | ☐ 1/8 | ☐ 1/8 | ☐ 1/8 | ☐ 1/8 | ☐ 1/8 | ☐ 1/8 | ☐ 1/8 |

Referring to Table 7 (above), each of timeslots 10t . . . T show AT A transmitting a half-rate frame, whereas each of ATs B . . . E transmit a ⅛th rate frame or silence frame at timeslots 10t . . . T. Accordingly, for each of timeslots 10t . . . T, 615A of FIG. 6A selects AT A's half-rate frame for transmitting to ATs B . . . E on an output stream.

Next, in 620A, for each of timeslots 10t . . . T, the application server 170 transmits frames for a given timeslot of the output stream, which includes AT A's half-rate frame, to each of ATs B . . . E. Also, 625A and 630A correspond to optional steps which may also be performed by the application server 170. In 625A, the application server 170 selects one of the frames for the given timeslot from one of ATs B . . . E that was not selected in 615A, for transmission to AT A. For example, the selection of 625A may be performed in accordance with the selection algorithm of FIG. 5B or 5C, except that AT A's frame is not considered in 625A. Based on Table 7 (above), each of timeslots 10t . . . T are composed of the same frame-rates from each of ATs A . . . E. For convenience of explanation, assume that the selection of 625A selects AT C's frame for each of timeslots 10t . . . T. Thus, in 630A, for each of 10t . . . T, the application server 170 transmits frames for one or more timeslots of the output stream, which includes AT C's ⅛th rate frame, to AT A. While illustrated in separate blocks, it will be appreciated that the transmissions of 620A and 630A may be performed concurrently. Accordingly, based on the assumptions presented above, the output stream that is transmitted to ATs A . . . E in 620A and 630A may be represented as follows:

TABLE 8

Media Frames in the output stream from the MCC to ATs A . . . E

| | 10t | 9t | 8t | 7t | 6t | 5t | 4t | 3t | 2t | T |
|---|---|---|---|---|---|---|---|---|---|---|
| A | ▢1/8 (C) | ▢1/8 (C) | ▢1/8 (C) | ▢1/8 (C) | ▢1/8 (C) | ▢1/8 (C) | ▢1/8 (C) | ▢1/8 (C) | ▢1/8 (C) | ▢1/8 (C) |
| B | ■1/2 (A) | ■1/2 (A) | ■1/2 (A) | ■1/2 (A) | ■1/2 (A) | ■1/2 (A) | ■1/2 (A) | ■1/2 (A) | ■1/2 (A) | ■1/2 (A) |
| C | ■1/2 (A) | ■1/2 (A) | ■1/2 (A) | ■1/2 (A) | ■1/2 (A) | ■1/2 (A) | ■1/2 (A) | ■1/2 (A) | ■1/2 (A) | ■1/2 (A) |
| D | ■1/2 (A) | ■1/2 (A) | ■1/2 (A) | ■1/2 (A) | ■1/2 (A) | ■1/2 (A) | ■1/2 (A) | ■1/2 (A) | ■1/2 (A) | ■1/2 (A) |
| E | ■1/2 (A) | ■1/2 (A) | ■1/2 (A) | ■1/2 (A) | ■1/2 (A) | ■1/2 (A) | ■1/2 (A) | ■1/2 (A) | ■1/2 (A) | ■1/2 (A) | wherein the AT indicated in parentheses for each frame in the output stream denotes the frame from the indicated AT on the input stream for the corresponding timeslot.

FIG. 6B illustrates the group communication session process of FIG. 5A in accordance with another embodiment of the invention. In particular, FIG. 6B illustrates a process wherein the multiple-frame selection process of FIGS. 5D and/or 5E is implemented, instead of the single-frame selection process of FIGS. 5B and/or 5C as in FIG. 6A.

Accordingly, as in FIG. 6A, within the same timeslot, AT B transmits a ⅛th rate silence frame, 600B, ATs C . . . E also each transmit ⅛th rate silence frames, 605B, and AT A transmits a half-rate data frame carrying voice data, 610B.

Next, in 615B, the MCC module 172 of the application server 170 selects a frame from more than one of ATs A . . . E for re-transmission upon an output stream to each other AT. In the example of FIG. 6B, it may be assumed that the frame from AT A corresponds to one of the selected frames, because in this example AT A is the only AT among ATs A . . . E to transmit a high data-rate frame (e.g., a half-rate frame). Thus, in the selection process of FIG. 5D, AT A's frame is selected at 515D after the decision in 510D that only one high data-rate frame is present. Then, after the selection of AT A's frame, it may be assumed within this example for the sake of convenience that AT B's frame is also selected in 520D. Thus, the example provided herein assumes that two frames are selected in 615B, although in other embodiments more than two frames could be selected in 615B. In an alternative example, if the selection process of FIG. 5E were implemented instead of FIG. 5D, it will be appreciated that AT A's frame is selected at 515E after the decision in 510E that only one high data-rate frame is present. For convenience, it will further be assumed under this implementation that AT B's frame is selected at 520E. Thus, going forward, assume frames from ATs A and B are selected in 615B.

After selecting frames from ATs A and B in 615B, the MCC module 172 mixes the selected frames in 620B. This mixing can correspond to the same manner by which conventional media streams are mixed (e.g., in a digital processing sense), except the mixing in 620B is limited to a selected subset of frames (e.g., from ATs A and B only), and not a mixing of each frame from each participant to the group communication session with permission to transmit (e.g., in this case ATs A . . . E). Accordingly, the MCC module 172 then sends the mixed frames (i.e., frame A+frame B) to ATs C . . . E, sends the un-mixed frame from AT B to AT A and sends the un-mixed frame from AT A to AT B. It is appreciated that, in this embodiment, the mixed-frame is not sent to AT A or AT B so as to reduce an occurrence of feedback, although it is at least theoretically possible that the mixed-frame could be sent to all participants in the same manner to simplify programming logic at the MCC module 172 in other embodiments. However, in an alternative embodiments where three or more frames are selected in 615B, then each AT associated with one of the selected frames would actually receive a mixed frame, although each selected AT's own frame would be removed from the stream that it receives.

Further, for clarity, it will be appreciated that 600B through 615B of FIG. 6A correspond to 525 through 540, respectively, of FIG. 5A. Assuming the transmissions of 600B through 610B and the selection of 615B repeat for ten (10) timeslots (i.e., 10t . . . T), the input stream received at the application server 170 in timeslots 10t . . . T may be represented as illustrated above in Table 7.

Accordingly, in 620B, for each of timeslots 10t . . . T, the application server 170 transmits frames for a given timeslot of the output stream, which includes AT A's half-rate frame and AT B's ⅛th rate frame, to each of ATs C . . . E. Also, 625B and 630B correspond to optional steps which may also be performed by the application server 170. In 625B, the application server 170 selects one of the frames for the given timeslot from one of ATs C . . . E that was not selected in 615B, for transmission to ATs A and B. For example, the selection of 625B may be performed in accordance with the selection algorithm of FIG. 5B or 5C, except that frames from ATs A and B are not considered in 625B. Based on Table 7 (above), each of timeslots 10t . . . T are composed of the same frame-rates from each of ATs A . . . E. For convenience of explanation, assume that the selection of 625B selects AT C's frame for each of timeslots 10t . . . T. Thus, in 630B, for each of 10t . . . T, the application server 170 transmits frames for one or more timeslots of the output stream, which includes AT C's ⅛th rate frame, to ATs A and B (e.g., in addition to the un-mixed frames from AT A to AT B and from AT B to AT A). While illustrated in separate blocks, it will be appreciated that the transmissions of 620B and 630B may be performed concurrently. Accordingly, based on the assumptions presented above, the output stream that is transmitted to ATs A . . . E in 620B and 630B may be represented as follows:

TABLE 8A

| | \multicolumn{10}{c|}{Media frames in the output stream from the MCC to ATs A . . . E} |
|---|---|---|---|---|---|---|---|---|---|---|
| | 10t | 9t | 8t | 7t | 6t | 5t | 4t | 3t | 2t | T |
| A | ☐ 1/8 (B + C) | ☐ 1/8 (B + C) | ☐ 1/8 (B + C) | ☐ 1/8 (B + C) | ☐ 1/8 (B + C) | ☐ 1/8 (B + C) | ☐ 1/8 (B + C) | ☐ 1/8 (B + C) | ☐ 1/8 (B + C) | ☐ 1/8 (B + C) |
| B | ■ 1/2 (A + B) | ■ 1/2 (A + B) | ■ 1/2 (A + B) | ■ 1/2 (A + B) | ■ 1/2 (A + B) | ■ 1/2 (A + B) | ■ 1/2 (A + B) | ■ 1/2 (A + B) | ■ 1/2 (A + B) | ■ 1/2 (A + B) |
| C | ■ 1/2 (A + B) | ■ 1/2 (A + B) | ■ 1/2 (A + B) | ■ 1/2 (A + B) | ■ 1/2 (A + B) | ■ 1/2 (A + B) | ■ 1/2 (A + B) | ■ 1/2 (A + B) | ■ 1/2 (A + B) | ■ 1/2 (A + B) |
| D | ■ 1/2 (A + B) | ■ 1/2 (A + B) | ■ 1/2 (A + B) | ■ 1/2 (A + B) | ■ 1/2 (A + B) | ■ 1/2 (A + B) | ■ 1/2 (A + B) | ■ 1/2 (A + B) | ■ 1/2 (A + B) | ■ 1/2 (A + B) |
| E | ■ 1/2 (A + B) | ■ 1/2 (A + B) | ■ 1/2 (A + B) | ■ 1/2 (A + B) | ■ 1/2 (A + B) | ■ 1/2 (A + B) | ■ 1/2 (A + B) | ■ 1/2 (A + B) | ■ 1/2 (A + B) | ■ 1/2 (A + B) | wherein each, at each timeslot over 10t . . . T, AT A receives a ¼th rate frame (i.e., combining ⅛th rate frames from ATs B and C), AT B receives a ⅝th rate frame (i.e., combining a ½th rate frame from AT A and a ⅛th rate frame from AT C) and each of ATs C . . . E receive a ⅝th rate frame (i.e., combining a ½th rate frame from AT A and a ⅛th rate frame from AT B).

Accordingly, as will be appreciated upon a review of FIGS. 6A and 6B, the selection of 540 of FIG. 5A may correspond to a selection of a single frame from one AT for transmission to each other AT per timeslot (e.g., see FIG. 6A), or alternatively may correspond to a selection of a single frame from multiple ATs (e.g., two or more) for transmission to each other AT per timeslot (e.g., see FIG. 6B). Below, additional embodiments have been directed to a single frame selection from a single AT per timeslot, as in FIG. 6A or the selection processes of FIGS. 5B and 5C. However, the description of these embodiments have been provided for convenience of explanation, and not to imply that frames from multiple ATs cannot be selected in the embodiments described below with respect to FIGS. 7 through 13. In other words, it is within the ability of one of ordinary skill in the art to apply the multiple frame-selection per timeslot as in FIG. 5D, 5E or 6B to each of the embodiments described below, such that references to single-frame selection from a single-AT per timeslot are simply examples to facilitate understanding of the embodiments.

Accordingly, an example will now be provided of an interspersed talk spurt, wherein different of ATs A . . . E take turns transmitting high data-rate frames (e.g., which may be indicated a conversation is taking place with many participants). Thus, assume that the process of FIG. 6A (e.g., or FIG. 6B, in another embodiment) executes for at least one time interval or timeslot, and the process of FIG. 6A then advances to 700 of FIG. 7.

Referring to FIG. 7, at a next timeslot following the transmission of the output stream for a given timeslot in 620A and 630A of FIG. 6A, assume that AT B transmits a half-rate data frame carrying voice data, 700, ATs C . . . E each transmit ⅛th rate silence frames, 705, and AT A transmits a ⅛th rate silence frame, 710. Next, in 715, the MCC module 172 of the application server 170 selects a frame from one of ATs A . . . E for re-transmission upon an output stream to each other AT. In the example of FIG. 7, because only the frame from AT B has a high data-rate (e.g., in this case, a ½ or half data-rate), AT B is selected in 715. It will be appreciated that AT B would be selected irrespective of the call-type of the group communication session in FIG. 7, because the selection algorithm of FIG. 5B would select AT B in 515B, whereas the selection algorithm of FIG. 5C would select AT B in 515C. Further, for clarity, it will be appreciated that 700 through 715 of FIG. 7 correspond to 525 through 540, respectively, of FIG. 5A.

Assuming the transmissions of 600A through 610A repeat for five (5) timeslots (10t . . . 6t), and that the transmissions of 700 through 710 repeat for the next five (5) timeslots (5t . . . T), the input stream received at the application server 170 over timeslots 10t . . . T may be represented as follows:

TABLE 9

| | \multicolumn{10}{c|}{Media Frames arriving at the MCC from ATs A . . . E at 't' intervals} |
|---|---|---|---|---|---|---|---|---|---|---|
| | 10t | 9t | 8t | 7t | 6t | 5t | 4t | 3t | 2t | T |
| A | ■ 1/2 | ■ 1/2 | ■ 1/2 | ■ 1/2 | ■ 1/2 | ☐ 1/8 | ☐ 1/8 | ☐ 1/8 | ☐ 1/8 | ☐ 1/8 |
| B | ☐ 1/8 | ☐ 1/8 | ☐ 1/8 | ☐ 1/8 | ☐ 1/8 | ■ 1/2 | ■ 1/2 | ■ 1/2 | ■ 1/2 | ■ 1/2 |
| C | ☐ 1/8 | ☐ 1/8 | ☐ 1/8 | ☐ 1/8 | ☐ 1/8 | ☐ 1/8 | ☐ 1/8 | ☐ 1/8 | ☐ 1/8 | ☐ 1/8 |
| D | ☐ 1/8 | ☐ 1/8 | ☐ 1/8 | ☐ 1/8 | ☐ 1/8 | ☐ 1/8 | ☐ 1/8 | ☐ 1/8 | ☐ 1/8 | ☐ 1/8 |
| E | ☐ 1/8 | ☐ 1/8 | ☐ 1/8 | ☐ 1/8 | ☐ 1/8 | ☐ 1/8 | ☐ 1/8 | ☐ 1/8 | ☐ 1/8 | ☐ 1/8 |

Referring to Table 9 (above), each of timeslots 10t . . . 6t show AT A transmitting a half-rate frame, whereas each of ATs B . . . E transmit a ⅛th rate frame or silence frame. Then, each of timeslots 5t . . . T show AT B transmitting a half-rate frame, whereas each of ATs A and C . . . E transmit a ⅛th rate frame or silence frame. Accordingly, for each of 10t . . . 6t, 615A of FIG. 6A selects AT A's half-rate frame for transmitting to ATs B . . . E on an output stream, whereas for each of 5t . . . T, 715 of FIG. 7 selects AT B's half-rate frame for transmitting to ATs A and C . . . E on the output stream Next, in 720, for each of timeslots 5t . . . T, the application server 170 transmits the output stream, which includes AT B's half-rate frame, to each of ATs A and C . . . E. Also, 725 and 730 correspond to optional steps which may also be performed by the application server 170. In 725, for timeslots 5t . . . T, the application server 170 selects one of the frames for the given timeslot from one of ATs A and C . . . E that was not selected in 715, for transmission to AT B. For example, the selection of 725 may be performed in accordance with the selection algorithm of FIG. 5B or 5C, except that AT B's frame is not considered in 725. Based on Table 9 (above), each of timeslots 5t . . . T are composed of the same framerates from each of ATs A . . . E. For convenience of explanation, assume that the selection of 725 selects AT C's frame for each of timeslots 5t . . . T. Thus, in 730, for each of 5t . . . T, the application server 170 transmits the output stream, which includes AT C's ⅛th rate frame, to AT B. While illustrated in separate blocks, it will be appreciated that the transmissions of 720 and 730 may be performed concurrently. Accordingly, based on the assumptions presented above, the output stream that is transmitted to ATs A . . . E over timeslots 10t . . . T, based on the input stream of Table 9 (above), may be represented as follows:

TABLE 10

Media Frames in the output stream from the MCC to ATs A . . . E

| | 10t | 9t | 8t | 7t | 6t | 5t | 4t | 3t | 2t | T |
|---|---|---|---|---|---|---|---|---|---|---|
| A | ☐1/8 (C) | ☐1/8 (C) | ☐1/8 (C) | ☐1/8 (C) | ☐1/8 (C) | ■1/2 (B) | ■1/2 (B) | ■1/2 (B) | ■1/2 (B) | ■1/2 (B) |
| B | ■1/2 (A) | ■1/2 (A) | ■1/2 (A) | ■1/2 (A) | ■1/2 (A) | ☐1/8 (C) | ☐1/8 (C) | ☐1/8 (C) | ☐1/8 (C) | ☐1/8 (C) |
| C | ■1/2 (A) | ■1/2 (A) | ■1/2 (A) | ■1/2 (A) | ■1/2 (A) | ■1/2 (B) | ■1/2 (B) | ■1/2 (B) | ■1/2 (B) | ■1/2 (B) |
| D | ■1/2 (A) | ■1/2 (A) | ■1/2 (A) | ■1/2 (A) | ■1/2 (A) | ■1/2 (B) | ■1/2 (B) | ■1/2 (B) | ■1/2 (B) | ■1/2 (B) |
| E | ■1/2 (A) | ■1/2 (A) | ■1/2 (A) | ■1/2 (A) | ■1/2 (A) | ■1/2 (B) | ■1/2 (B) | ■1/2 (B) | ■1/2 (B) | ■1/2 (B) |

While the example of FIG. 6A is directed to a continuous talk spurt (e.g., a series of high data-rate frames) from a single AT (i.e., AT A), and FIG. 7 is directed to an interspersed talk spurt (e.g., ATs take turns transmitting high data-rate frames), an example of multiple ATs transmitting high data-rate frames at the same time will now be provided with respect to FIG. 8. FIG. 8 also provides an example of how to evaluate timeslots where no ATs are transmitting high data-rate frames.

Referring to FIG. 8, each of ATs A . . . E transmit frames (e.g., data frames and/or silence frames) at given data rates over a ten timeslot interval of 10t . . . T, 800, 805 and 810.

In 815, for each of timeslots 10t . . . T, the MCC module 172 of the application server 170 selects a frame from one of ATs A . . . E for re-transmission upon an output stream to each other AT. In the example of FIG. 8, assume that the transmissions of 800 through 810 result in an input stream as illustrated in Table 11 (below) at the MCC module 172 of the application server 170:

from FIG. 7 (e.g., see Table 9, above), and the half-rate frame from AT B is selected, because AT B is the only AT among ATs A . . . E to transmit a high data-rate frame in these timeslots.

However, in timeslots 9t and 6t of Table 11 (above), both of ATs A and B transmit half-rate frames. Accordingly, for 9t and 6t in 815 of FIG. 8, the application server 170 applies a selection algorithm, such as illustrated in FIGS. 5B and/or 5C, based on the call-type for the group communication session. For example, if each of ATs A . . . E have the same priority level for the group communication session's call-type, the selection of 815 is performed in accordance with FIG. 5B, and if two or more of ATs A . . . E have different priority levels for the group communication session's call-type, the selection of 815 is performed in accordance with FIG. 5C. In either case, for convenience of explanation, assume that a concurrent high data-rate frame transmission between ATs A and B in FIG. 8 evaluates to AT B's frame being selected, irrespective of the call-type (e.g., based on the selection of 530B in FIG. 5B, or the selection of 520C in FIG. 5C).

Also, in timeslot 4t, each of ATs A . . . E transmit a ⅛th rate silence frame. Accordingly, the determinations of 500B of FIGS. 5B and 500C of FIG. 5C advance to 505B and 505C, respectively, which selects the first listener's silence frame for transmission in 4t, irrespective of the call-type.

Also, as in 625A/725 and 630A/730 above, 825 and 830 correspond to optional steps which may also be performed by the application server 170. In 825, for each of timeslots 10t . . . T, the application server 170 selects one of the frames for the given timeslot from one of ATs A . . . E that was not selected in 815 for a corresponding timeslot, for transmission

TABLE 11

Media Frames arriving at the MCC from ATs A . . . E at 't' intervals

| | 10t | 9t | 8t | 7t | 6t | 5t | 4t | 3t | 2t | T |
|---|---|---|---|---|---|---|---|---|---|---|
| A | ■1/2 | ■1/2 | ☐1/8 | ☐1/8 | ■1/2 | ☐1/8 | ☐1/8 | ■1/2 | ■1/2 | ■1/2 |
| B | ☐1/8 | ■1/2 | ■1/2 | ■1/2 | ■1/2 | ■1/2 | ☐1/8 | ☐1/8 | ☐1/8 | ☐1/8 |
| C | ☐1/8 | ☐1/8 | ☐1/8 | ☐1/8 | ☐1/8 | ☐1/8 | ☐1/8 | ☐1/8 | ☐1/8 | ☐1/8 |
| D | ☐1/8 | ☐1/8 | ☐1/8 | ☐1/8 | ☐1/8 | ☐1/8 | ☐1/8 | ☐1/8 | ☐1/8 | ☐1/8 |
| E | ☐1/8 | ☐1/8 | ☐1/8 | ☐1/8 | ☐1/8 | ☐1/8 | ☐1/8 | ☐1/8 | ☐1/8 | ☐1/8 |

Accordingly, the selection for timeslots 10t and 3t . . . T of Table 11 (above) is performed in accordance with FIG. 6A (e.g., see Table 7, above), and the half-rate frame from AT A is selected, because AT A is the only AT among ATs A . . . E to transmit a high data-rate frame in these timeslots. Likewise, the selection for timeslots 8t, 7t and 5t of Table 11 (above) is performed in accordance with timeslots 5t . . . T to the AT associated with the selected frame of the corresponding timeslot. In 825, assume that AT B's ⅛th rate frame is selected for 10t and 3t . . . T, and that AT C's ⅛th rate frame is selected for 9t . . . 5t. It will be appreciated that 825 and 830 are not performed in 4t, because there are no data frames in the input stream, such that the selected ⅛ silent frame from 815 is sent to each of ATs A . . . E (e.g., even though one of ATs A . . . E will be fed back its own silence frame). The application server 170 then transmits the selected frames from 825 to the ATs over 10t . . . 5t and 3t . . . T, 830.

Accordingly, based on the assumptions presented above, the output stream that is transmitted to ATs A . . . E over timeslots 10t . . . T in 820 and 830 may be represented as follows:

TABLE 12

Media Frames in the output stream from the MCC to ATs A . . . E

|   | 10t | 9t | 8t | 7t | 6t | 5t | 4t | 3t | 2t | T |
|---|---|---|---|---|---|---|---|---|---|---|
| A | □$_{1/8}$ (B) | ■1/2 (B) | ■1/2 (B) | ■1/2 (B) | ■1/2 (B) | ■1/2 (B) | □$_{1/8}$ (B) | □$_{1/8}$ (B) | □$_{1/8}$ (B) | □$_{1/8}$ (B) |
| B | ■1/2 (A) | □$_{1/8}$ (C) | □$_{1/8}$ (C) | □$_{1/8}$ (C) | □$_{1/8}$ (C) | □$_{1/8}$ (C) | □$_{1/8}$ (B) | ■1/2 (A) | ■1/2 (A) | ■1/2 (A) |
| C | ■1/2 (A) | ■1/2 (B) | ■1/2 (B) | ■1/2 (B) | ■1/2 (B) | ■1/2 (B) | □$_{1/8}$ (B) | ■1/2 (A) | ■1/2 (A) | ■1/2 (A) |
| D | ■1/2 (A) | ■1/2 (B) | ■1/2 (B) | ■1/2 (B) | ■1/2 (B) | ■1/2 (B) | □$_{1/8}$ (B) | ■1/2 (A) | ■1/2 (A) | ■1/2 (A) |
| E | ■1/2 (A) | ■1/2 (B) | ■1/2 (B) | ■1/2 (B) | ■1/2 (B) | ■1/2 (B) | □$_{1/8}$ (B) | ■1/2 (A) | ■1/2 (A) | ■1/2 (A) |

As will be appreciated by one of ordinary skill in the art, the manner in which the header of the RTP packets is configured on the output stream to ATs A . . . E can affect whether the target AT will successfully decode the RTP packet containing the frame, or will simply drop the frame. For example, the general framework of the RTP packet header portion is illustrated in Table 1 (above). As noted above, among other fields, the RTP packet header includes the CC field, the Sequence Number field, the Timestamp field and the SSRC number field, each of which is defined above with respect to Table 1 (above).

An AT decoding a media stream may have certain expectations as to what types of values are associated with valid RTP packets for the media stream for each of these fields. For example, if a RTP packet is received at the AT with the wrong SSRC number, timestamp value, and/or sequence number, the RTP packet may simply be dropped by the AT. As will be appreciated, each media stream received from ATs A . . . E at the application server 170 is composed of RTP packets with field values specific to each AT's reverse link media stream. For example, AT A has its own SSRC value to identify its media stream, and so on.

Figure 9:
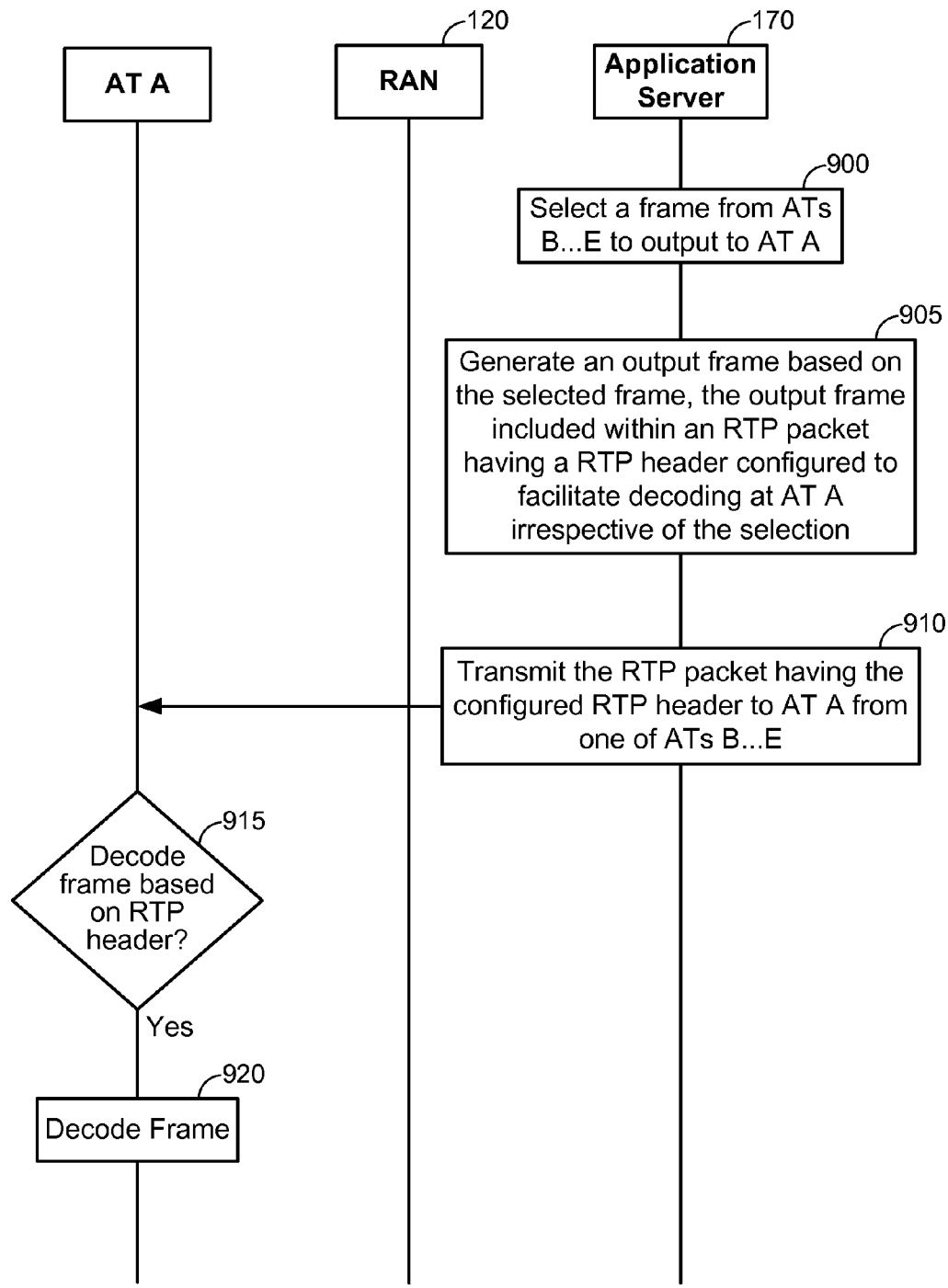
FIG. 9 illustrates a high-level process by which one or more media flow parameters associated with a selected frame of an input media flow can be modified in an output media flow according to an embodiment of the invention.

FIG. 9 illustrates a high-level process by which the application server 170 can reduce a packet drop rate at target ATs for a group communication session's media flow during switches, at the application server 170, from one AT's frames to another AT's frames, according to an embodiment of the invention.

Referring to FIG. 9, in 900, the application server 170 selects a frame from one of ATs B . . . E for transmission to AT A on an output stream within a given timeslot. In an example, the selection of 900 may correspond to any frame selection from above-described embodiments (e.g., 540 of FIG. 5A, 615A of FIG. 6A, 625A of FIG. 6A, etc.). Next, the application server 170 generates an output frame for transmission to AT A within the given timeslot of an output stream, 905. In 905, the application server 170 configures an RTP packet header of an RTP packet carrying the output frame for AT A to facilitate decoding at AT A irrespective of which of ATs B . . . E's frame is being sent to AT A within the configured RTP packet. In other words, media flow parameters (e.g., CC field, timestamp field, SSRC field, sequence number field, etc.) from the selected frame on the input stream are reconfigured, if necessary, for the RTP packet carrying the output stream.

For example, as will be described below in greater detail, the configuring of 905 may include modifying the CC field, the Sequence Number field, the Timestamp field and/or SSRC number field from the RTP packet header received in the application server 170's input stream, that is specific to the transmitting or originating AT, to field values that are maintained by the application server 170 for the output stream of the group communication session. Thus, while the data payload portion of the RTP packet is modified in accordance with whichever frame from the input stream is selected to be output to AT A, the RTP packet header portion can be adjusted as necessary to facilitate decoding at AT A, and need not simply map to the RTP packet carrying the selected frame on the input stream.

After configuring the output frame with the modified RTP packet header portion, the application server 170 transmits the configured output frame to AT A, 910. Based at least in part on the manner in which the RTP packet header portion in the output frame is configured, AT A determines whether to decode the RTP packet, 915. Because of the configuration of the RTP packet header portion, assume that AT A determines to decode the RTP packet in 915, and the RTP packet and associated frame are decoded by AT A, 920.

More specific examples of RTP packet header modifications that can be made at the application server 170 to facilitate decoding at target ATs to a group communication session will now be described with respect to FIGS. 10 through 13.

Figure 10:
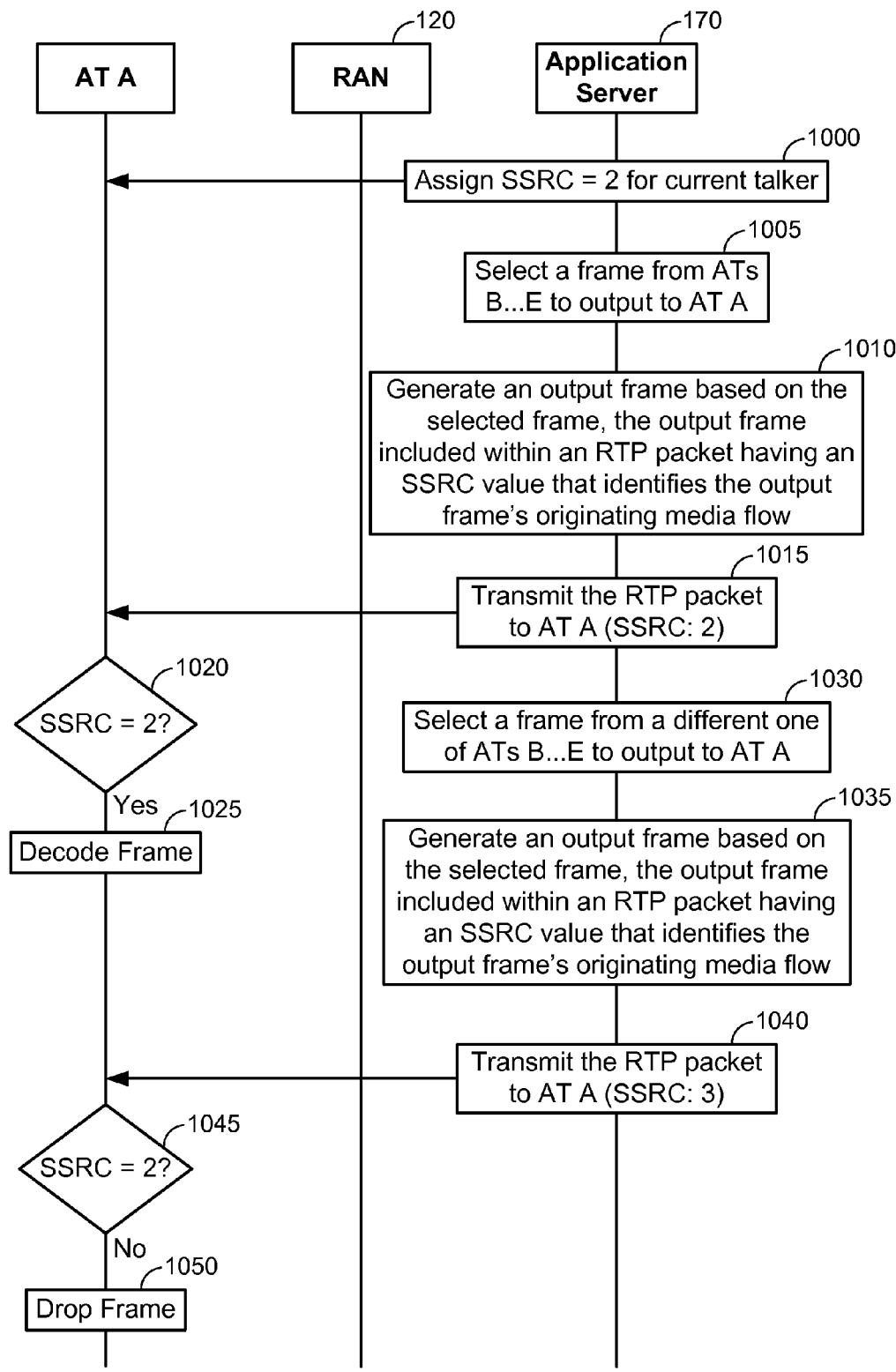
FIG. 10 illustrates an example of a decoding process where the process of FIG. 9 is not performed with respect to a Source Synchronization (SSRC) media flow parameter.
Figure 11:
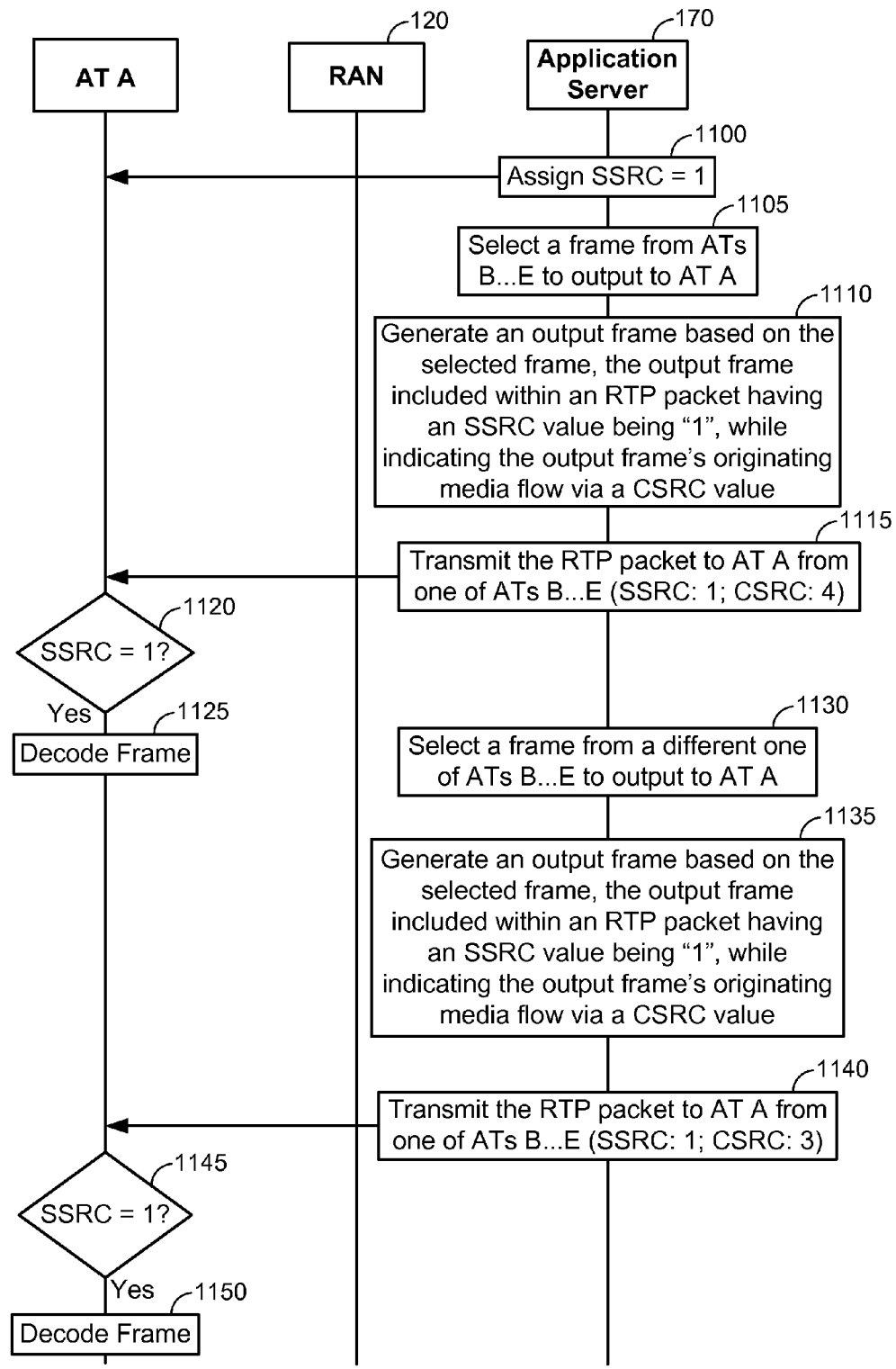
FIG. 11 illustrates an example of a decoding process where the process of FIG. 9 is performed with respect to the SSRC media flow parameter.

For example, FIG. 10 illustrates decoding results at AT A during the group communication session of any of FIGS. 5A, 6, 7 and/or 8, where the application server 170 refrains from modifying a SSRC value of the RTP packets forwarded to AT A in the output stream, whereas FIG. 11 illustrates decoding results at AT A during the same group communication session where the application server 170 modifies the SSRC value in accordance with FIG. 9.

Referring to FIG. 10, the application server 170 assigns a SSRC value (e.g., SSRC=2) to AT A that identifies a current speaker, or floor-holder, for the group communication session, 1000. For example, the assignment of the SSRC value in 1000 may correspond to an ASK/FYI message, and AT A only decodes RTP packets for the group communication session that have a SSRC value corresponding to the most recently assigned SSRC value. Thus, AT A will only decode RTP packets having a SSRC value of 2 until another SSRC value assignment message (e.g., ASK/FYI message) is received at AT A. As will be appreciated the ASK (user identity) message is sent by the AT to the application server 170 in the event the AT receives an RTP packet with an unknown or unexpected SSRC. The application server 170 responds to the ASK message with the identity of the client that the previously unknown SSRC value corresponds to. In the above portion of FIG. 10, the ASK message which prompts the SSRC assignment or FYI message in step 1000 of FIG. 10 can be triggered at AT A when AT A receives the RTP packets from SSRC 2 before SSRC 2 is assigned in step 1000, and again after SSRC 3 is received later at step 1040, discussed below.

Next, the application server 170 selects a frame from one of ATs B . . . E for transmission to AT A on an output stream within a given timeslot, 1005. In an example, the selection of 1000 may correspond to 540 of FIG. 5A, 615A of FIG. 6A, 625A of FIG. 6A, etc. Next, the application server 170 generates an output frame for transmission to AT A within the given timeslot of an output stream, 1010. In the example of FIG. 10, assume that the RTP packet carrying the output frame maintains, in its header portion, the SSRC value associated with the originating AT for the frame, which has an SSRC value of 2. Accordingly, the application server 170 transmits the output frame in the RTP packet including the non-modified SSRC value of 2 to AT A, 1015.

AT A receives the RTP packet carrying the transmitted output frame (e.g., and potentially, other output frames as well) and evaluates at least the SSRC value in the RTP packet header in order to determine whether to decode the payload of the RTP packet, 1020. In particular, AT A checks whether the SSRC value in the RTP packet header portion equals 2. Because it is assumed that the SSRC value for the RTP packet is 2, AT A decodes the frame, 1025.

Next, the application server 170 selects a frame from a different one of ATs B . . . E for transmission to AT A on an output stream within a next timeslot, 1030. Next, the application server 170 generates an output frame for transmission to AT A within the next timeslot of an output stream, 1035. In the example of FIG. 10, assume that the RTP packet carrying the output frame maintains the SSRC value associated with the originating AT for the frame, which now has an SSRC value of 3 (e.g., because the application server 170 has switched to a frame from another AT). Accordingly, the application server 170 transmits the output frame in the RTP packet including the non-modified SSRC value of 3 to AT A, 1040.

AT A receives the RTP packet carrying the transmitted output frame and evaluates at least the SSRC value in the header in order to determine whether to decode the payload of the RTP packet, 1045. In particular, AT A checks whether the SSRC value in the RTP packet header portion equals 2. Because it is assumed that the SSRC value for the RTP packet is 3, AT A drops the frame, 1050. Also, it is understood that RTP packets from SSRC 2 after AT A is assigned to decode SSRC 3 should be dropped only if an associated timestamp in the RTP packet header is older than the most current packet from SSRC 3, as this will reduce an occurrence of dropped packets if the SSRC 2 RTP packet is a legitimate transition back to SSRC 2.

In an illustrative example, assume that SSRC values assigned to ATs A . . . E for their reverse link RTP packet transmissions are 1 . . . 5, respectively. Next, assume that an input stream received at the MCC module 172 of the application server 170 over timeslots 10t . . . T corresponds to Table 11 (above). Accordingly, the output stream transmitted to ATs A . . . E, which has already been described above with respect to Table 12 (above), may include SSRC values for each output frame, or RTP packet (e.g., with the assumption that there is a one-to-one mapping between output frames and RTP packets and multiple output frames are not bundled within a single RTP packet), of the output stream, as follows:

TABLE 13

Media Frames in the output stream from the MCC to ATs A . . . E as in Table 12, including SSRC values from originating ATs

| | 10t | 9t | 8t | 7t | 6t | 5t | 4t | 3t | 2t | T |
|---|---|---|---|---|---|---|---|---|---|---|
| A | ☐ 1/8 (B) SSRC: 2 | ■ 1/2 (B) SSRC: 2 | ■ 1/2 (B) SSRC: 2 | ■ 1/2 (B) SSRC: 2 | ■ 1/2 (B) SSRC: 2 | ■ 1/2 (B) SSRC: 2 | ☐ 1/8 (B) SSRC: 2 | ☐ 1/8 (B) SSRC: 2 | ☐ 1/8 (B) SSRC: 2 | ☐ 1/8 (B) SSRC: 2 |
| B | ■ 1/2 (A) SSRC: 1 | ☐ 1/8 (C) SSRC: 3 | ☐ 1/8 (C) SSRC: 3 | ☐ 1/8 (C) SSRC: 3 | ☐ 1/8 (C) SSRC: 3 | ☐ 1/8 (C) SSRC: 3 | ☐ 1/8 (B) SSRC: 2 | ■ 1/2 (A) SSRC: 1 | ■ 1/2 (A) SSRC: 1 | ■ 1/2 (A) SSRC: 1 |
| C | ■ 1/2 (A) SSRC: 1 | ■ 1/2 (B) SSRC: 2 | ■ 1/2 (B) SSRC: 2 | ■ 1/2 (B) SSRC: 2 | ■ 1/2 (B) SSRC: 2 | ■ 1/2 (B) SSRC: 2 | ☐ 1/8 (B) SSRC: 2 | ■ 1/2 (A) SSRC: 1 | ■ 1/2 (A) SSRC: 1 | ■ 1/2 (A) SSRC: 1 |
| D | ■ 1/2 (A) SSRC: 1 | ■ 1/2 (B) SSRC: 2 | ■ 1/2 (B) SSRC: 2 | ■ 1/2 (B) SSRC: 2 | ■ 1/2 (B) SSRC: 2 | ■ 1/2 (B) SSRC: 2 | ☐ 1/8 (B) SSRC: 2 | ■ 1/2 (A) SSRC: 1 | ■ 1/2 (A) SSRC: 1 | ■ 1/2 (A) SSRC: 1 |
| E | ■ 1/2 (A) SSRC: 1 | ■ 1/2 (B) SSRC: 2 | ■ 1/2 (B) SSRC: 2 | ■ 1/2 (B) SSRC: 2 | ■ 1/2 (B) SSRC: 2 | ■ 1/2 (B) SSRC: 2 | ☐ 1/8 (B) SSRC: 2 | ■ 1/2 (A) SSRC: 1 | ■ 1/2 (A) SSRC: 1 | ■ 1/2 (A) SSRC: 1 |

Next, assume that the SSRC value assignment of 1000 for packet decoding transmits (SSRC=2) to AT A as described above, and separately indicates (SSRC=1) to each of ATs B . . . E. Under these assumptions, it will be appreciated that assuming no additional SSRC value assignment messages are sent to ATs A . . . E, and the process of FIG. 10 is executed at ATs A . . . E over timeslots 10t . . . T, then Table 14 (below) indicates the RTP packets (e.g., with the assumption that there is a one-to-one mapping between output frames and RTP packets and multiple output frames are not bundled within a single RTP packet) that are actually decoded, or played back, at each of ATs A . . . E, as follows:

TABLE 14

Media Frames decoded at ATs A . . . E as in Table 12, where RTP packets
including the media frames include SSRC values from originating ATs

| | 10t | 9t | 8t | 7t | 6t | 5t | 4t | 3t | 2t | T |
|---|---|---|---|---|---|---|---|---|---|---|
| A | □$_{1/8}$ (B) SSRC: 2 | ■1/2 (B) SSRC: 2 | ■1/2 (B) SSRC: 2 | ■1/2 (B) SSRC: 2 | ■1/2 (B) SSRC: 2 | ■1/2 (B) SSRC: 2 | □$_{1/8}$ (B) SSRC: 2 | □$_{1/8}$ (B) SSRC: 2 | □$_{1/8}$ (B) SSRC: 2 | □$_{1/8}$ (B) SSRC: 2 |
| B | | ■1/2 (A) SSRC: 1 | | | | | | ■1/2 (A) SSRC: 1 | ■1/2 (A) SSRC: 1 | ■1/2 (A) SSRC: 1 |
| C | | ■1/2 (A) SSRC: 1 | | | | | | ■1/2 (A) SSRC: 1 | ■1/2 (A) SSRC: 1 | ■1/2 (A) SSRC: 1 |
| D | | ■1/2 (A) SSRC: 1 | | | | | | ■1/2 (A) SSRC: 1 | ■1/2 (A) SSRC: 1 | ■1/2 (A) SSRC: 1 |
| E | | ■1/2 (A) SSRC: 1 | | | | | | ■1/2 (A) SSRC: 1 | ■1/2 (A) SSRC: 1 | ■1/2 (A) SSRC: 1 |

As shown in Table 14, ATs B . . . E drop each packet between timeslots 9t . . . 4t because the associated SSRC value is not 1.

Accordingly, FIG. 11 illustrates the process of FIG. 9 applied to the scenario presented in FIG. 10. FIG. 11 illustrates decoding results at AT A during the group communication session of any of FIGS. 5A, 6, 7 and/or 8, where the application server 170 modifies the SSRC value of the RTP packets forwarded to AT A in the output stream in accordance with FIG. 9.

Referring to FIG. 11, the application server 170 assigns a SSRC value (e.g., SSRC=1) to AT A that is used to identify any RTP packet forwarded by the application server 170 for the group communication session, 1100. The SSRC assignment of 1100 need only be performed once per group communication session, irrespective of the application server 170 switching between frames of different ATs during the group communication session. Thus, AT A will only decode packets having a SSRC value of 1 during the group communication session. While not shown explicitly within FIG. 11, each of ATs B . . . E also receive the SSRC value assignment message instructing ATs B . . . E to decode RTP packets with SSRC values being equal to 1 for the group communication session.

Next, the application server 170 selects a frame from one of ATs B . . . E for transmission to AT A on an output stream within a given timeslot, 1105. In an example, the selection of 1105 may correspond to 540 of FIG. 5A, 615A of FIG. 6A, 625A of FIG. 6A, etc. Next, the application server 170 generates an output frame for transmission to AT A within the given timeslot of an output stream, 1110. In particular, the application server 170 modifies the SSRC value of a RTP packet carrying the output frame in 1110, if necessary, such that the SSRC value for the generated output frame is 1. Also, the application server 170 may optionally modify the CSRC value of the RTP packet carrying the output frame to an SSRC value that indicates the SSRC value of the output frame's originating AT. Thus, if the SSRC value of a RTP packet associated with the selected frame in the input stream is 4, the SSRC value of the output frame replaces 4 with 1, and sets CSRC to be equal to 4. Accordingly, the application server 170 transmits the output frame within the RTP packet including the (potentially) modified SSRC value of 1 to AT A, 1115 (e.g., and optionally, the CSRC value of 4).

AT A receives the RTP packet carrying the transmitted output frame and evaluates at least the SSRC value in the header in order to determine whether to decode the payload of the RTP packet, 1120. In particular, AT A checks whether the SSRC value in the RTP packet header portion equals 1. Because the application server 170 has set the SSRC value for the RTP packet to 1, AT A decodes the frame, 1125.

Next, the application server 170 selects a frame from a different one of ATs B . . . E for transmission to AT A on an output stream within a next timeslot, 1130. Next, the application server 170 generates an output frame for transmission to AT A within the next timeslot of an output stream, 1135. As in 1110, irrespective of an SSRC value in an input stream of an RTP packet for the newly selected frame, the SSRC value of the RTP packet carrying the output frame in the output stream to AT A is set to 1, and an CSRC value corresponding to the SSRC value of the selected frame's RTP packet on the input stream may optionally be added to the RTP packet header portion of the RTP packet carrying the output frame, in 1135. Accordingly, the application server 170 transmits the output frame within the RTP packet including the (potentially) modified SSRC value of 1 to AT A, 1140 (e.g., and optionally, the CSRC value of 4).

AT A receives the RTP packet carrying the transmitted output frame and evaluates at least the SSRC value in the header in order to determine whether to decode the payload of the RTP packet, 1145. In particular, AT A checks whether the SSRC value in the RTP packet header portion equals 1. Because the application server 170 has set the SSRC value for the RTP packet to 1, AT A decodes the frame, 1150.

In an illustrative example, assume that SSRC values assigned to ATs A . . . E for their reverse link RTP packet transmissions are 1 . . . 5, respectively. Next, assume that an input stream received at the MCC module 172 of the application server 170 over timeslots 10t . . . T corresponds to Table 11 (above). Accordingly, the output stream transmitted to ATs A . . . E, which has already been described above with respect to Table 12 (above), may include SSRC values for each RTP packet carrying output frames (e.g., with the assumption that there is a one-to-one mapping between output frames and RTP packets and multiple output frames are not bundled within a single RTP packet) of the output stream, as follows:

(above) not only illustrates the output stream, but also illustrates the playback at each of the respective ATs A . . . E, because no packets are dropped.

While FIGS. 10 and 11 are directed to demonstrating the effect of SSRC values upon packet decoding decisions at ATs during a group communication session, another RTP packet header field that can affect packet decoding decisions is the sequence number, as will now be described with respect to FIGS. 12 and 13.

Figure 12:
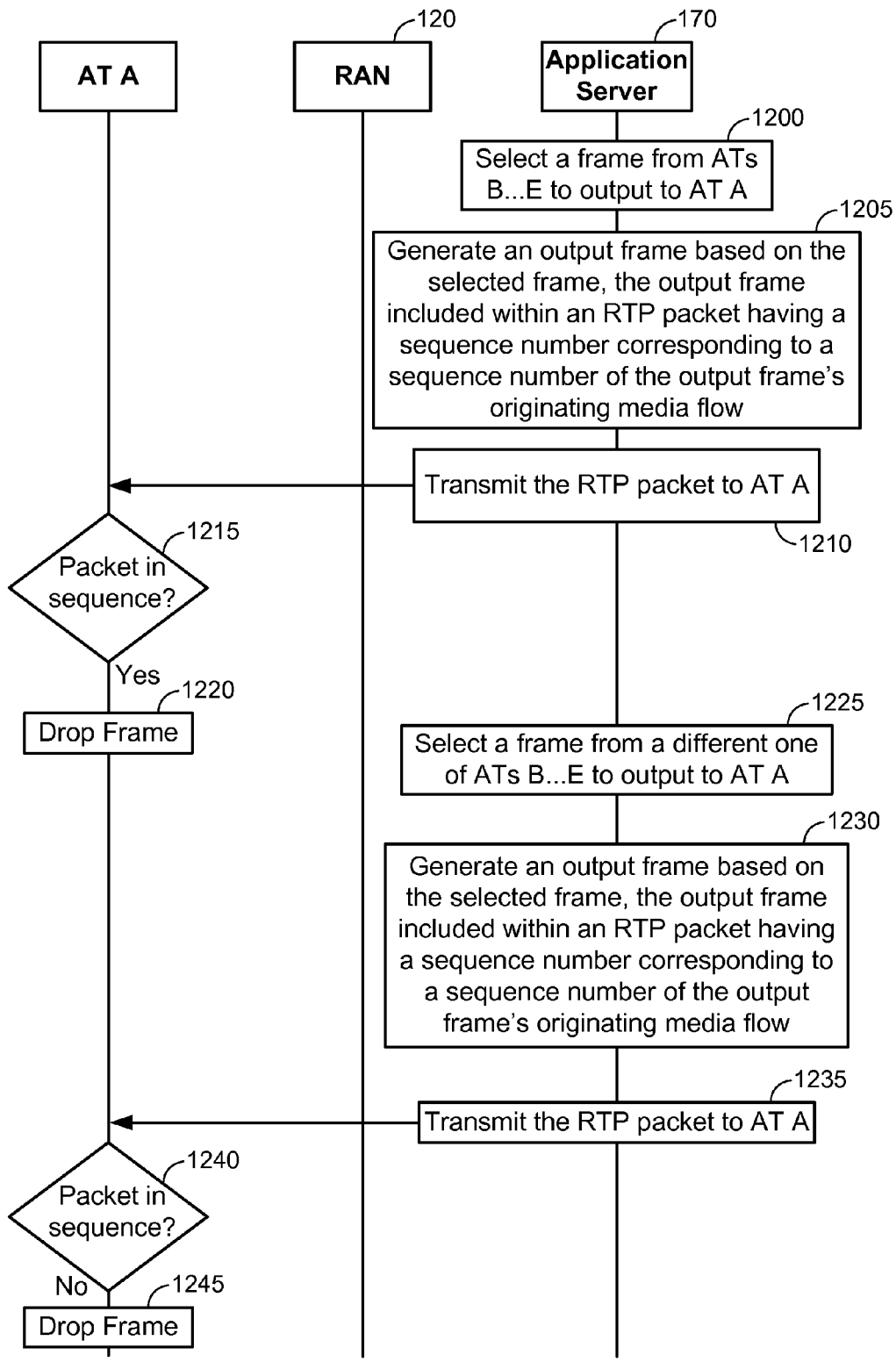
FIG. 12 illustrates an example of a decoding process where the process of FIG. 9 is not performed with respect to the Sequent Number media flow parameter.
Figure 13:
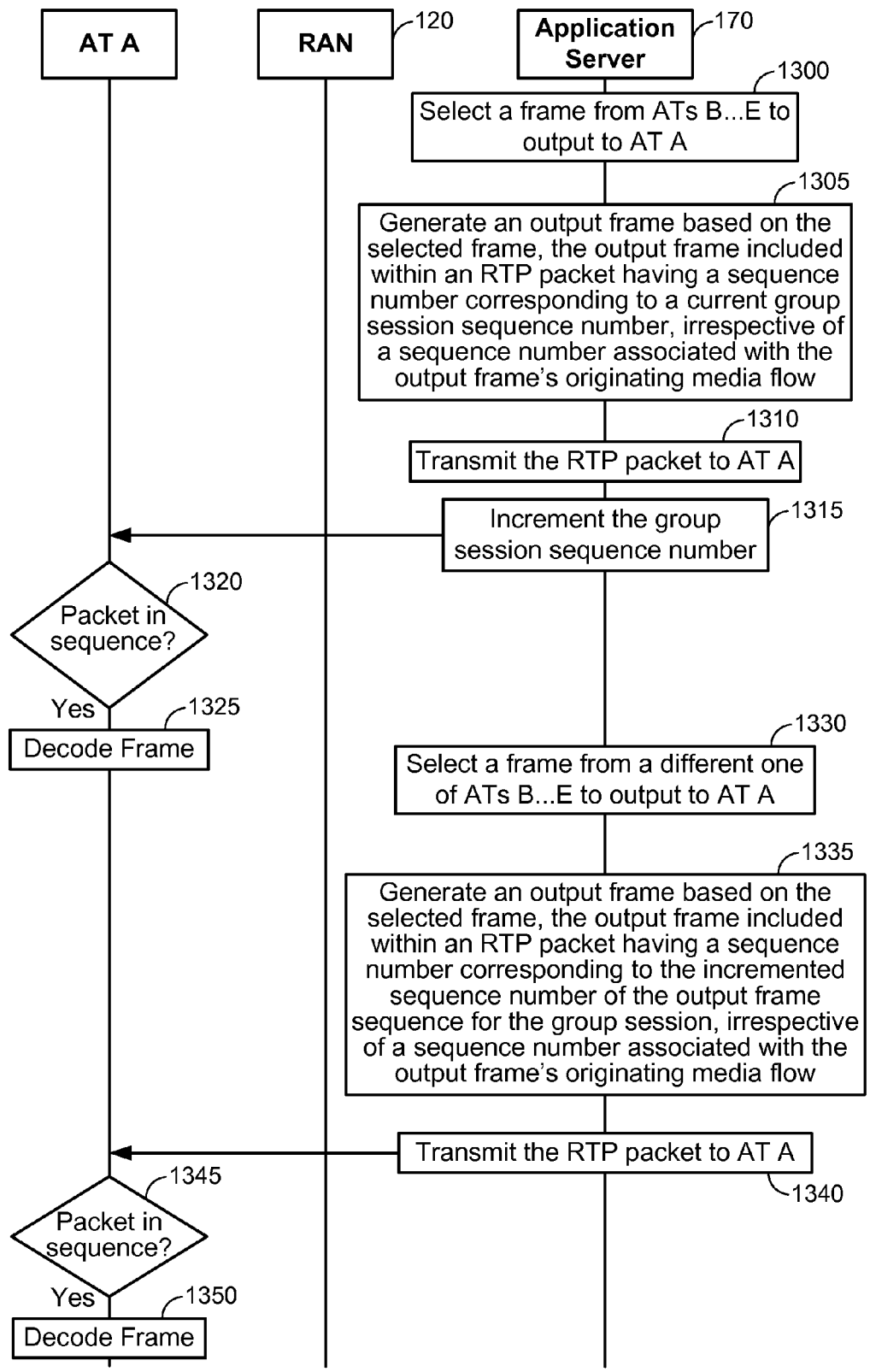
FIG. 13 illustrates an example of a decoding process where the process of FIG. 9 is performed with respect to the Sequence Number media flow parameter.

For example, FIG. 12 illustrates decoding results at AT A during the group communication session of any of FIGS. 5A, 6, 7 and/or 8, where the application server 170 refrains from modifying a sequence number value of the RTP packets forwarded to AT A in the output stream, whereas FIG. 13 illustrates decoding results at AT A during the same group communication session where the application server 170 modifies the sequence number value in accordance with FIG. 9.

Referring to FIG. 12, in 1200, the application server 170 selects a frame from one of ATs B . . . E for transmission to AT A on an output stream within a given timeslot, 1200. In an example, the selection of 1200 may correspond to 540 of FIG.

TABLE 15

Media Frames in the output stream from the MCC to ATs A . . . E as in Table 12, where RTP packets including the media frames include a single SSRC value for the group communication session

| | 10t | 9t | 8t | 7t | 6t | 5t | 4t | 3t | 2t | T |
|---|---|---|---|---|---|---|---|---|---|---|
| A | ☐1/8 | ■1/2 | ■1/2 | ■1/2 | ■1/2 | ■1/2 | ☐1/8 | ☐1/8 | ☐1/8 | ☐1/8 |
| | (B) | (B) | (B) | (B) | (B) | (B) | (B) | (B) | (B) | (B) |
| | SSRC: 1 | SSRC: 1 | SSRC: 1 | SSRC: 1 | SSRC: 1 | SSRC: 1 | SSRC: 1 | SSRC: 1 | SSRC: 1 | SSRC: 1 |
| B | ■1/2 | ☐1/8 | ☐1/8 | ☐1/8 | ☐1/8 | ☐1/8 | ☐1/8 | ■1/2 | ■1/2 | ■1/2 |
| | (A) | (C) | (C) | (C) | (C) | (C) | (B) | (A) | (A) | (A) |
| | SSRC: 1 | SSRC: 1 | SSRC: 1 | SSRC: 1 | SSRC: 1 | SSRC: 1 | SSRC: 1 | SSRC: 1 | SSRC: 1 | SSRC: 1 |
| C | ■1/2 | ■1/2 | ■1/2 | ■1/2 | ■1/2 | ■1/2 | ☐1/8 | ■1/2 | ■1/2 | ■1/2 |
| | (A) | (B) | (B) | (B) | (B) | (B) | (B) | (A) | (A) | (A) |
| | SSRC: 1 | SSRC: 1 | SSRC: 1 | SSRC: 1 | SSRC: 1 | SSRC: 1 | SSRC: 1 | SSRC: 1 | SSRC: 1 | SSRC: 1 |
| D | ■1/2 | ■1/2 | ■1/2 | ■1/2 | ■1/2 | ■1/2 | ☐1/8 | ■1/2 | ■1/2 | ■1/2 |
| | (A) | (B) | (B) | (B) | (B) | (B) | (B) | (A) | (A) | (A) |
| | SSRC: 1 | SSRC: 1 | SSRC: 1 | SSRC: 1 | SSRC: 1 | SSRC: 1 | SSRC: 1 | SSRC: 1 | SSRC: 1 | SSRC: 1 |
| E | ■1/2 | ■1/2 | ■1/2 | ■1/2 | ■1/2 | ■1/2 | ☐1/8 | ■1/2 | ■1/2 | ■1/2 |
| | (A) | (B) | (B) | (B) | (B) | (B) | (B) | (A) | (A) | (A) |
| | SSRC: 1 | SSRC: 1 | SSRC: 1 | SSRC: 1 | SSRC: 1 | SSRC: 1 | SSRC: 1 | SSRC: 1 | SSRC: 1 | SSRC: 1 |

Next, assume that the SSRC value assignment of 1000 for packet decoding transmits (SSRC=1) to AT A as described above, and separately indicates (SSRC=1) to each of ATs B . . . E. Under these assumptions, it will be appreciated that assuming no additional SSRC value assignment messages are sent to ATs A . . . E, and the process of FIG. 11 is executed at ATs A . . . E over timeslots 10t . . . T, then Table 15

5A, 615A of FIG. 6A, 625A of FIG. 6A, etc. Next, the application server 170 generates an output frame for transmission to AT A within the given timeslot of an output stream, 1205. In the example of FIG. 12, assume that the RTP packet carrying the output frame maintains the sequence number value associated with the originating AT's RTP packet carrying the frame, which has a sequence number for the current timeslot of 2021. Accordingly, the application server 170 transmits the output frame within an RTP packet including the non-modified sequence number value of 2021 to AT A, 1210.

AT A receives the RTP packet carrying the transmitted output frame and evaluates at least the sequence number value in the header in order to determine whether to decode the payload of the RTP packet, 1215. In particular, AT A checks whether the sequence number value in the RTP packet header portion is in sequence with one or more previous RTP packets. In 1215, assume that the sequence number value is in sequence, and AT A decodes the RTP packet payload and thereby the frame, 1220.

Next, the application server 170 selects a frame from a different one of ATs B . . . E for transmission to AT A on an output stream within a next timeslot, 1225. Next, the application server 170 generates an output frame for transmission to AT A within the next timeslot of an output stream, 1230. In the example of FIG. 12, assume that the RTP packet carrying the output frame maintains the sequence number value associated with the originating AT for the frame, which, for example, can have a sequence number of 102. Accordingly, the application server 170 transmits the output frame within a RTP packet including the non-modified sequence number value of 102 to AT A, 1235.

AT A receives the RTP packet carrying the transmitted output frame and evaluates at least the sequence number value in the header in order to determine whether to decode the payload of the RTP packet, 1240. In particular, AT A checks whether the sequence number value in the RTP packet header portion is in sequence with one or more previous RTP packets. Because the sequence number of 102 is not in sequence with the sequence number of 2021, AT A drops the frame (i.e., does not decode the RTP packet payload portion), 1245.

In an illustrative example, assume that sequence number values assigned to ATs A . . . E for their reverse link RTP packet transmissions over timeslots 10t . . . T for the input stream of Table 11 (above), are denoted by Table 16 (below), as follows:

TABLE 16

| | Media Frames arriving at the MCC from ATs A . . . E at 't' intervals | | | | | | | | |
|---|---|---|---|---|---|---|---|---|---|
| | 10t | 9t | 8t | 7t | 6t | 5t | 4t | 3t | 2t | T |
| A | ■1/2 SEQ: 0003 | ■1/2 SEQ: 0004 | □1/8 SEQ: 0005 | □1/8 SEQ: 0006 | ■1/2 SEQ: 0007 | □1/8 SEQ: 0008 | □1/8 SEQ: 0009 | ■1/2 SEQ: 0010 | ■1/2 SEQ: 0011 | ■1/2 SEQ: 0012 |
| B | □1/8 SEQ: 2008 | ■1/2 SEQ: 2009 | ■1/2 SEQ: 2010 | ■1/2 SEQ: 2011 | ■1/2 SEQ: 2012 | ■1/2 SEQ: 2013 | □1/8 SEQ: 2014 | □1/8 SEQ: 2015 | □1/8 SEQ: 2016 | □1/8 SEQ: 2017 |
| C | □1/8 SEQ: 1002 | □1/8 SEQ: 1003 | □1/8 SEQ: 1004 | □1/8 SEQ: 1005 | □1/8 SEQ: 1006 | □1/8 SEQ: 1007 | □1/8 SEQ: 1008 | □1/8 SEQ: 1009 | □1/8 SEQ: 1010 | □1/8 SEQ: 1011 |
| D | □1/8 SEQ: 3001 | □1/8 SEQ: 3002 | □1/8 SEQ: 3003 | □1/8 SEQ: 3004 | □1/8 SEQ: 3005 | □1/8 SEQ: 3006 | □1/8 SEQ: 3007 | □1/8 SEQ: 3008 | □1/8 SEQ: 3009 | □1/8 SEQ: 3010 |
| E | □1/8 SEQ: 4005 | □1/8 SEQ: 4006 | □1/8 SEQ: 4007 | □1/8 SEQ: 4008 | □1/8 SEQ: 4009 | □1/8 SEQ: 4010 | □1/8 SEQ: 4011 | □1/8 SEQ: 4012 | □1/8 SEQ: 4013 | □1/8 SEQ: 4014 |

Accordingly, the output stream transmitted to ATs A . . . E, which has already been described above with respect to Table 12 (above), may include sequence number values for each RTP packet carrying an associated output frame (e.g., with the assumption that there is a one-to-one mapping between output frames and RTP packets and multiple output frames are not bundled within a single RTP packet) of the output stream, as follows:

TABLE 17

| | Media Frames in the output stream from the MCC to ATs A . . . E as in Table 12, including sequence number values from originating ATs | | | | | | | | |
|---|---|---|---|---|---|---|---|---|---|
| | 10t | 9t | 8t | 7t | 6t | 5t | 4t | 3t | 2t | T |
| A | □1/8 (B) | ■1/2 (B) | ■1/2 (B) | ■1/2 (B) | ■1/2 (B) | ■1/2 (B) | □1/8 (B) | □1/8 (B) | □1/8 (B) | □1/8 (B) |

TABLE 17-continued

Media Frames in the output stream from the MCC to ATs A . . . E as in Table 12, including sequence number values from originating ATs

| | | 10t | 9t | 8t | 7t | 6t | 5t | 4t | 3t | 2t | T |
|---|---|---|---|---|---|---|---|---|---|---|---|
| | | SEQ: 2008 | SEQ: 2009 | SEQ: 2010 | SEQ: 2011 | SEQ: 2012 | SEQ: 2013 | SEQ: 2014 | SEQ: 2015 | SEQ: 2016 | SEQ: 2017 |
| B | | ■1/2 (A) | □1/8 (C) | □1/8 (C) | □1/8 (C) | □1/8 (C) | □1/8 (C) | □1/8 (B) | ■1/2 (A) | ■1/2 (A) | ■1/2 (A) |
| | | SEQ: 0003 | SEQ: 1003 | SEQ: 1004 | SEQ: 1005 | SEQ: 1006 | SEQ: 1007 | SEQ: 2014 | SEQ: 0010 | SEQ: 0011 | SEQ: 0012 |
| C | | ■1/2 (A) | ■1/2 (B) | ■1/2 (B) | ■1/2 (B) | ■1/2 (B) | ■1/2 (B) | □1/8 (B) | ■1/2 (A) | ■1/2 (A) | ■1/2 (A) |
| | | SEQ: 0003 | SEQ: 2009 | SEQ: 2010 | SEQ: 2011 | SEQ: 2012 | SEQ: 2013 | SEQ: 2014 | SEQ: 0010 | SEQ: 0011 | SEQ: 0012 |
| D | | ■1/2 (A) | ■1/2 (B) | ■1/2 (B) | ■1/2 (B) | □1/2 (B) | ■1/2 (B) | □1/8 (B) | ■1/2 (A) | ■1/2 (A) | ■1/2 (A) |
| | | SEQ: 0003 | SEQ: 2009 | SEQ: 2010 | SEQ: 2011 | SEQ: 2012 | SEQ: 2013 | SEQ: 2014 | SEQ: 0010 | SEQ: 0011 | SEQ: 0012 |
| E | | ■1/2 (A) | ■1/2 (B) | ■1/2 (B) | ■1/2 (B) | ■1/2 (B) | ■1/2 (B) | □1/8 (B) | ■1/2 (A) | ■1/2 (A) | ■1/2 (A) |
| | | SEQ: 0003 | SEQ: 2009 | SEQ: 2010 | SEQ: 2011 | SEQ: 2012 | SEQ: 2013 | SEQ: 2014 | SEQ: 0010 | SEQ: 0011 | SEQ: 0012 |

Under these assumptions, it will be appreciated that if the process of FIG. 12 is executed at ATs A . . . E over timeslots 10t . . . T, then Table 18 (below) indicates the RTP packets that are actually decoded, or played back, at each of ATs A . . . E, as follows:

TABLE 18

Media Frames decoded at ATs A . . . E as in Table 12, where the media frames include sequence number values from originating ATs

| | 10t | 9t | 8t | 7t | 6t | 5t | 4t | 3t | 2t | T |
|---|---|---|---|---|---|---|---|---|---|---|
| A | □1/8 (B) SEQ: 2008 | ■1/2 (B) SEQ: 2009 | ■1/2 (B) SEQ: 2010 | ■1/2 (B) SEQ: 2011 | ■1/2 (B) SEQ: 2012 | ■1/2 (B) SEQ: 2013 | □1/8 (B) SEQ: 2014 | □1/8 (B) SEQ: 2015 | □1/8 (B) SEQ: 2016 | □1/8 (B) SEQ: 2017 |
| B | ■1/2 (A) SEQ: 0003 | | | | | | | ■1/2 (A) SEQ: 0010 | ■1/2 (A) SEQ: 0011 | ■1/2 (A) SEQ: 0012 |
| C | ■1/2 (A) SEQ: 0003 | | | | | | | ■1/2 (A) SEQ: 0010 | ■1/2 (A) SEQ: 0011 | ■1/2 (A) SEQ: 0012 |
| D | ■1/2 (A) SEQ: 0003 | | | | | | | ■1/2 (A) SEQ: 0010 | ■1/2 (A) SEQ: 0011 | ■1/2 (A) SEQ: 0012 |
| E | ■1/2 (A) SEQ: 0003 | | | | | | | ■1/2 (A) SEQ: 0010 | ■1/2 (A) SEQ: 0011 | ■1/2 (A) SEQ: 0012 |

As shown in Table 18, ATs B . . . E drop each frames between timeslots 9t . . . 4t because the associated sequence number value is not in sequence.

Next, FIG. 13 illustrates the process of FIG. 9 applied to the scenario presented in FIG. 12. FIG. 12 illustrates decoding results at AT A during the group communication session of any of FIGS. 5A, 6, 7 and/or 8, where the application server 170 modifies the sequence number value of the RTP packets forwarded to AT A in the output stream in accordance with FIG. 9.

Referring to FIG. 13, the application server 170 maintains a single stream of sequence number values (e.g., 0001, 0002, 0003, etc.) that are used for RTP packets on the output stream, irrespective of the individual sequence numbers associated with the RTP packets on the input stream.

In 1300, the application server 170 selects a frame from one of ATs B . . . E for transmission to AT A on an output stream within a given timeslot. In an example, the selection of 1300 may correspond to 540 of FIG. 5A, 615A of FIG. 6A, 625A of FIG. 6A, etc. Next, the application server 170 generates an output frame for transmission to AT A within the given timeslot of an output stream, 1305. In particular, the application server 170 modifies the sequence number value of a RTP packet carrying the output frame in 1305, if necessary, such that the sequence number value for the RTP packet corresponds to a current sequence number of an output frame sequence for the group communication session ("group communication session sequence number") (e.g., 0001). Accordingly, the application server 170 transmits the output frame within the RTP packet including the current group communication session sequence number to AT A, 1310, and then increments the group communication session sequence number, 1315 (e.g., from 0001 to 0002).

AT A receives the RTP packet carrying the transmitted output frame and evaluates at least the sequence number value in the header in order to determine whether to decode the payload of the RTP packet, 1320. In particular, AT A checks whether the sequence number value in the RTP packet header portion is in sequence. Because the group communication session sequence number remains in sequence irrespective of whether the application server 170 switches between media flows of different ATs, AT A decodes the RTP packet payload portion and thereby decodes the frame, 1325.

Next, the application server 170 selects a frame from a different one of ATs B . . . E for transmission to AT A on an output stream within a next timeslot, 1330. Next, the application server 170 generates an output frame for transmission to AT A within the next timeslot of an output stream, 1335. As in 1305, irrespective of an sequence number value in an input stream of a RTP packet carrying the newly selected frame, the sequence number value of a RTP packet carrying the output frame in the output stream to AT A is set to the current group communication session sequence number (e.g., 0002), in 1335. Accordingly, the application server 170 transmits the output frame within the RTP packet including the current group communication session sequence number to AT A, 1340.

AT A receives the RTP packet carrying the transmitted output frame and evaluates at least the sequence number value in the header in order to determine whether to decode the payload of the RTP packet, 1345. In particular, AT A checks whether the sequence number value in the RTP packet header portion is in sequence. Because the group communication session sequence number remains in sequence irrespective of whether the application server 170 switches between media flows of different ATs, AT A decodes the RTP payload portion and thereby decodes the frame, 1350.

In an illustrative example, assume that sequence number values assigned to ATs A . . . E for their reverse link RTP packet transmissions over timeslots 10t . . . T for the input stream of Table 11 (above), are denoted by Table 16 (above). Under these assumptions, it will be appreciated that if the process of FIG. 13 is executed at ATs A . . . E over timeslots 10t . . . T, then Table 19 (below) indicates the output stream transmitted to ATs A . . . E, which has already been described above with respect to Table 12 (above), including sequence number values for RTP packets carrying each output frame (e.g., with the assumption that there is a one-to-one mapping between output frames and RTP packets and multiple output frames are not bundled within a single RTP packet) of the output stream, as follows:

TABLE 19

Media Frames in the output stream from the MCC to ATs A . . . E as in Table 12, including group communication session sequence numbers

|   | 10t | 9t | 8t | 7t | 6t | 5t | 4t | 3t | 2t | T |
|---|-----|----|----|----|----|----|----|----|----|----|
| A | ☐$_{1/8}$ (B) SEQ: 0001 | ■$_{1/2}$ (B) SEQ: 0002 | ■$_{1/2}$ (B) SEQ: 0003 | ■$_{1/2}$ (B) SEQ: 0004 | ■$_{1/2}$ (B) SEQ: 0005 | ■$_{1/2}$ (B) SEQ: 0006 | ☐$_{1/8}$ (B) SEQ: 0007 | ☐$_{1/8}$ (B) SEQ: 0008 | ☐$_{1/8}$ (B) SEQ: 0009 | ☐$_{1/8}$ (B) SEQ: 0010 |
| B | ■$_{1/2}$ (A) SEQ: 0001 | ☐$_{1/8}$ (C) SEQ: 0002 | ☐$_{1/8}$ (C) SEQ: 0003 | ☐$_{1/8}$ (C) SEQ: 0004 | ☐$_{1/8}$ (C) SEQ: 0005 | ☐$_{1/8}$ (C) SEQ: 0006 | ☐$_{1/8}$ (B) SEQ: 0007 | ■$_{1/2}$ (A) SEQ: 0008 | ■$_{1/2}$ (A) SEQ: 0009 | ■$_{1/2}$ (A) SEQ: 0010 |
| C | ■$_{1/2}$ (A) SEQ: 0001 | ■$_{1/2}$ (B) SEQ: 0002 | ■$_{1/2}$ (B) SEQ: 0003 | ■$_{1/2}$ (B) SEQ: 0004 | ■$_{1/2}$ (B) SEQ: 0005 | ■$_{1/2}$ (B) SEQ: 0006 | ☐$_{1/8}$ (B) SEQ: 0007 | ■$_{1/2}$ (A) SEQ: 0008 | ■$_{1/2}$ (A) SEQ: 0009 | ■$_{1/2}$ (A) SEQ: 0010 |
| D | ■$_{1/2}$ (A) SEQ: 0001 | ■$_{1/2}$ (B) SEQ: 0002 | ■$_{1/2}$ (B) SEQ: 0003 | ■$_{1/2}$ (B) SEQ: 0004 | ■$_{1/2}$ (B) SEQ: 0005 | ■$_{1/2}$ (B) SEQ: 0006 | ☐$_{1/8}$ (B) SEQ: 0007 | ■$_{1/2}$ (A) SEQ: 0008 | ■$_{1/2}$ (A) SEQ: 0009 | ■$_{1/2}$ (A) SEQ: 0010 |
| E | ■$_{1/2}$ (A) SEQ: 0001 | ■$_{1/2}$ (B) SEQ: 0002 | ■$_{1/2}$ (B) SEQ: 0003 | ■$_{1/2}$ (B) SEQ: 0004 | ■$_{1/2}$ (B) SEQ: 0005 | ■$_{1/2}$ (B) SEQ: 0006 | ☐$_{1/8}$ (B) SEQ: 0007 | ■$_{1/2}$ (A) SEQ: 0008 | ■$_{1/2}$ (A) SEQ: 0009 | ■$_{1/2}$ (A) SEQ: 0010 |

Under these assumptions, it will be appreciated that assuming the process of FIG. 13 is executed at ATs A . . . E over timeslots 10t . . . T, then Table 19 (above) not only illustrates the output stream, but also illustrates the playback at each of the respective ATs A . . . E, because no RTP packets are dropped.

While FIGS. 11 and 13 have been directed towards implementations of FIG. 9 based on modification to SSRC and sequence numbers separately, it will be appreciated that the processes of FIGS. 11 and 13 may alternatively be performed concurrently. Also, other implementations of FIG. 9 may be directed to modifying other fields ("media flow parameters") of the RTP packet header to facilitate decoding, such as the Timestamp field of the RTP packet header. This embodiment will not be described in greater detail, as it should be readily apparent in view of the description of FIGS. 9 through 13 from above.

While embodiments have been above-described generally to audio-based group communication sessions, other embodiments can be directed to other types of group communication session, such as video conferences, etc. Also, while embodiments have been directed above to RTP packets, it will be appreciated that other embodiments of the invention can be directed to other types of media packets. For example, in a system operating in accordance with RealNetworks protocols, a RDT packet may be used instead of an RTP packet. In other words, as noted above, while embodiments have generally been directed to an implementation in accordance with EVRC-A protocols, other Vocoders (e.g., AMR, etc.) that have a discrete frame-rate set can be used in other embodiments of the invention.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of forwarding media during a group communication session within a wireless communications system, comprising:

receiving a frame for a given timeslot from each of a first plurality of access terminals participating in the group communication session, each of the received frames having an associated data rate;

selecting at least two and less than all of the received frames based at least in part on the associated data rates of each of the received frames;

determining to generate a first mixed frame from the selected at least two frames for delivery to a first subset of a second plurality of access terminals in the given timeslot;

determining to generate a second mixed frame from the selected at least two frames for delivery to a second subset of the second plurality of access terminals in the given timeslot;

determining that the first subset has a higher priority than the second subset;

allocating a higher level of processing power for generating the first mixed frame as compared to the second mixed frame based on the determination that the first subset has the higher priority; and sending the selected at least two frames in the given timeslot to the second plurality of access terminals participating in the group communication session.

2. The method of claim 1, wherein the receiving receives the frame from each of the first plurality of access terminals within a real-time transport protocol (RTP) packet.

3. The method of claim 2, wherein one or more of the RTP packets include multiple frames.

4. The method of claim 1, wherein the first plurality of access terminals corresponds to each access terminal participating in the group communication session that is assigned a reverse link channel on which to transmit media for the group communication session, and the second plurality of access terminals corresponds to each access terminal participating in the group communication session except for access terminals from which the selected at least two frames are received.

5. The method of claim 1, wherein the selecting includes:
determining whether a high data-rate frame is present from among the received frames.

6. The method of claim 5, wherein, if the determining determines no high data-rate frames are present within the received frames, the selecting selects in accordance with a given selection rule.

7. The method of claim 6, wherein the given selection rule is that a set of listeners that correspond to the first listeners to have joined the group communication session are selected.

8. The method of claim 5, wherein if the determining determines that at least one high data-rate frame is present within the received frames, the selecting further includes
determining a number of high data-rate frames among the received frames.

9. The method of claim 8, wherein the selecting further includes:
if a single high data-rate frame is determined to be present, the selecting selects the single high data-rate frame.

10. The method of claim 9, wherein the selecting further includes:
selecting at least one additional frame from among the received frames in accordance with a given selection rule.

11. The method of claim 10, wherein the given selection rule is to select one or more frames among the received frames received within a real-time transport protocol (RTP) packet having a lowest or highest Synchronization source (SSRC) number.

12. The method of claim 9, wherein the selecting further includes:
if multiple high data-rate frames are determined to be present, the selecting selects more than one frame having a highest data-rate from among the multiple high data-rate frames, or
if more frames have the highest data-rate than are required for selection, the selecting selects a given number of frames from among the multiple high data-rate frames that have the highest data-rate in accordance with a given selection rule.

13. The method of claim 12, wherein the selecting further includes:
selecting at least one additional frame from among the received frames based on another given selection rule if more frames than a number of the multiple high data-rate frames are required for selection.

14. The method of claim 13, wherein the another given selection rule is to select one or more frames among the received frames that are not among the multiple high data-rate frames and are received within a real-time transport protocol (RTP) packet having a lowest or highest Synchronization source (SSRC) number.

15. The method of claim 12, the given selection rule is selecting two or more frames among multiple frames that are received from access terminals having a highest priority level among the first plurality of access terminal.

16. The method of claim 12, the given selection rule is selecting two or more frames among multiple frames that are received within a real-time transport protocol (RTP) packet having a lowest or highest Synchronization source (SSRC) number.

17. The method of claim 1, wherein the first subset includes each access terminal whose frame was not selected, and the sending sends the first subset the first mixed frame that corresponds to a combined version of each of the selected at least two frames.

18. The method of claim 17, further comprising:
digitally processing the selected at least two frames to produce the first mixed frame based on the higher level of processing power at a server arbitrating the group communication session.

19. The method of claim 17, further comprising:
digitally processing the selected at least two frames to produce the first mixed frame based on a number of access terminals in the first subset.

20. The method of claim 17, wherein the sending sends, to each access terminal whose frame was selected, the same mixed frame except for its own selected frame being omitted.

21. The method of claim 1, wherein the receiving receives the frames from the first plurality of access terminals within a given packet from each of the first plurality of access terminals, each of the given packets including one or more media-flow parameters in a header portion that are specific to an input media flow for a particular access terminal.

22. The method of claim 21, further comprising:
configuring a given header portion of a packet carrying the first mixed frame or the second mixed frame to include the one or more media-flow parameters of an output media flow for the group communication session, irrespective of whether the one or more media-flow parameters of the output stream match the media-flow parameters for the input media flow.

23. The method of claim 22, wherein the sending sends the first mixed frame or the second mixed frame within the packet having the configured header portion.

24. The method of claim 22, wherein the packet corresponds to a real-time transport protocol (RTP) packet, and the one or more media-flow parameters include a Synchronization Source (SSRC) Value Field, a contribution count (CC) field holding a contributing source (CSRC) count value and/or a Timestamp Field and/or a Sequence Number Field.

25. The method of claim 1, further comprising:
selecting an additional frame from among the received frames, the selected additional frame being different than the selected at least two frames,
wherein the sending includes sending the selected additional frame to each of the first plurality of access terminals that sent a frame from the selected at least two frames.

26. The method of claim 1,
wherein the first subset is determined to have the higher priority based on the first subset including more access terminals than the second subset.

27. The method of claim 1, further comprising:
permitting a higher number of the selected at least two frames to be mixed into the first mixed frame as compared to the second mixed frame based on the determination that the second subset has the higher priority.

28. The method of claim 1, wherein the first plurality of access terminals includes five or more access terminals.

29. The method of claim 1, wherein the first and second mixed frames include different combinations of frames from the selected at least two frames.

30. The method of claim 29,
wherein the first subset does not provide any of the selected at least two frames,
wherein the second subset includes a given access terminal that provides a given frame from the selected at least two frames,
wherein the first mixed frame is configured to include each frame from the selected at least two frames, and
wherein the second mixed frame to be delivered to the given access terminal is configured to include each frame from the selected at least two frames except for the given frame provided by the given access terminal.

31. The method of claim 1, wherein sending the at least two frames includes sending the first mixed frame to the first subset and sending the second mixed frame to the second subset.

32. A server configured to arbitrate a group communication session within a wireless communications system, comprising:
means for receiving a frame for a given timeslot from each of a first plurality of access terminals participating in the group communication session, each of the received frames having an associated data rate;
means for selecting at least two and less than all of the received frames based at least in part on the associated data rates of each of the received frames;
means for determining to generate a first mixed frame from the selected at least two frames for delivery to a first subset of a second plurality of access terminals in the given timeslot;
means for determining to generate a second mixed frame from the selected at least two frames for delivery to a second subset of the second plurality of access terminals in the given timeslot;
means for determining that the first subset has a higher priority than the second subset;
means for allocating a higher level of processing power for generating the first mixed frame as compared to the second mixed frame based on the determination that the first subset has the higher priority; and
means for sending the selected at least two frames in the given timeslot to the second plurality of access terminals participating in the group communication session.

33. The server of claim 32, wherein the means for receiving receives the frame from each of the first plurality of access terminals within a real-time transport protocol (RTP) packet.

34. The server of claim 33, wherein one or more of the RTP packets include multiple frames.

35. The server of claim 32, wherein the first plurality of access terminals corresponds to each access terminal participating in the group communication session that is assigned a reverse link channel on which to transmit media for the group communication session, and the second plurality of access terminals corresponds to each access terminal participating in the group communication session except for access terminals from which the selected at least two frames are received.

36. A server configured to arbitrate a group communication session within a wireless communications system, comprising:
logic configured to receive a frame for a given timeslot from each of a first plurality of access terminals participating in the group communication session, each of the received frames having an associated data rate;
logic configured to select at least two and less than all of the received frames based at least in part on the associated data rates of each of the received frames;
logic configured to determine to generate a first mixed frame from the selected at least two frames for delivery to a first subset of a second plurality of access terminals in the given timeslot;
logic configured to determine to generate a second mixed frame from the selected at least two frames for delivery to a second subset of the second plurality of access terminals in the given timeslot;
logic configured to determine that the first subset has a higher priority than the second subset;
logic configured to allocate a higher level of processing power for generating the first mixed frame as compared to the second mixed frame based on the determination that the first subset has the higher priority; and
logic configured to send the selected at least two frames in the given timeslot to the second plurality of access terminals participating in the group communication session.

37. A non-transitory computer-readable medium comprising instructions, which, when executed by a server configured to arbitrate a group communication session within a wireless communications system, cause the server to perform actions, the instructions comprising:
instructions to receive a frame for a given timeslot from each of a first plurality of access terminals participating in the group communication session, each of the received frames having an associated data rate;
instructions to select at least two and less than all of the received frames based at least in part on the associated data rates of each of the received frames;
instructions to determine to generate a first mixed frame from the selected at least two frames for delivery to a first subset of a second plurality of access terminals in the given timeslot;
instructions to determine to generate a second mixed frame from the selected at least two frames for delivery to a second subset of the second plurality of access terminals in the given timeslot;
instructions to determine that the first subset has a higher priority than the second subset;
instructions to allocate a higher level of processing power for generating the first mixed frame as compared to the second mixed frame based on the determination that the first subset has the higher priority; and
instructions to send the selected at least two frames in the given timeslot to the second plurality of access terminals participating in the group communication session.

38. A method of forwarding media during a group communication session within a wireless communications system, comprising:
receiving a frame for a given timeslot from each of a first plurality of access terminals participating in the group communication session, each of the received frames having an associated data rate;
determining whether a high data-rate frame is present from among the received frames;

selecting a single frame from the received frames based at least in part on the associated data rates of each of the received frames; and sending the selected single frame to a second plurality of access terminals participating in the group communication session, wherein the selecting selects (i) in response to a determination that no high data-rate frames are present from among the received frames, the frame from among the received frames that is received from a first listener among the first plurality of access terminals that joined the group communication session, or (ii) in response to a determination that multiple high data-rate frames sharing a highest data rate are present from among a subset of the received frames, the frame from among the subset of the received frames that is received within a real-time transport protocol (RTP) packet having a lowest or highest Synchronization source (SSRC) number.

39. A server configured to arbitrate a group communication session within a wireless communications system, comprising:

means for receiving a frame for a given timeslot from each of a first plurality of access terminals participating in the group communication session, each of the received frames having an associated data rate;

means for determining whether a high data-rate frame is present from among the received frames;

means for selecting a single frame from the received frames based at least in part on the associated data rates of each of the received frames; and means for sending the selected single frame to a second plurality of access terminals participating in the group communication session, wherein the means for selecting selects (i) in response to a determination that no high data-rate frames are present from among the received frames, the frame from among the received frames that is received from a first listener among the first plurality of access terminals that joined the group communication session, or (ii) in response to a determination that multiple high data-rate frames sharing a highest data rate are present from among a subset of the received frames, the frame from among the subset of the received frames that is received within a real-time transport protocol (RTP) packet having a lowest or highest Synchronization source (SSRC) number.

40. A server configured to arbitrate a group communication session within a wireless communications system, comprising:

logic configured to receive a frame for a given timeslot from each of a first plurality of access terminals participating in the group communication session, each of the received frames having an associated data rate;

logic configured to determine whether a high data-rate frame is present from among the received frames;

logic configured to select a single frame from the received frames based at least in part on the associated data rates of each of the received frames; and logic configured to send the selected single frame to a second plurality of access terminals participating in the group communication session, wherein the logic configured to select selects (i) in response to a determination that no high data-rate frames are present from among the received frames, the frame from among the received frames that is received from a first listener among the first plurality of access terminals that joined the group communication session, or (ii) in response to a determination that multiple high data-rate frames sharing a highest data rate are present from among a subset of the received frames, the frame from among the subset of the received frames that is received within a real-time transport protocol (RTP) packet having a lowest or highest Synchronization source (SSRC) number.

41. A non-transitory computer-readable medium comprising instructions, which, when executed by a server configured to arbitrate a group communication session within a wireless communications system, cause the server to perform actions, the instructions comprising:

instructions to receive a frame for a given timeslot from each of a first plurality of access terminals participating in the group communication session, each of the received frames having an associated data rate;

instructions to determine whether a high data-rate frame is present from among the received frames;

instructions to select a single frame from the received frames based at least in part on the associated data rates of each of the received frames; and instructions to send the selected single frame to a second plurality of access terminals participating in the group communication session, wherein the instructions to select selects (i) in response to a determination that no high data-rate frames are present from among the received frames, the frame from among the received frames that is received from a first listener among the first plurality of access terminals that joined the group communication session, or (ii) in response to a determination that multiple high data-rate frames sharing a highest data rate are present from among a subset of the received frames, the frame from among the subset of the received frames that is received within a real-time transport protocol (RTP) packet having a lowest or highest Synchronization source (SSRC) number.

* * * * *